(12) United States Patent
Jarecki, Jr. et al.

(10) Patent No.: US 9,268,092 B1
(45) Date of Patent: Feb. 23, 2016

(54) GUIDED WAVE OPTO-ACOUSTIC DEVICE

(71) Applicant: Sandia Corporation, Albuquerque, NM (US)

(72) Inventors: Robert L. Jarecki, Jr., Albuquerque, NM (US); Peter Thomas Rakich, New Haven, CT (US); Ryan Camacho, Albuquerque, NM (US); Heedeuk Shin, Rochester, NY (US); Jonathan Albert Cox, Albuquerque, NM (US); Wenjun Qiu, Chicago, IL (US); Zheng Wang, Austin, TX (US)

(73) Assignee: Sandia Corporation, Albuquerque, NM (US)

( * ) Notice: Subject to any disclaimer, the term of this patent is extended or adjusted under 35 U.S.C. 154(b) by 231 days.

(21) Appl. No.: 14/055,774

(22) Filed: Oct. 16, 2013

Related U.S. Application Data

(60) Provisional application No. 61/785,163, filed on Mar. 14, 2013.

(51) Int. Cl.
| | |
|---|---|
| G02F 1/01 | (2006.01) |
| G02B 6/26 | (2006.01) |
| G02F 1/125 | (2006.01) |
| G02F 1/11 | (2006.01) |
| G02B 6/122 | (2006.01) |

(52) U.S. Cl.
CPC .............. G02B 6/26 (2013.01); G02B 6/1225 (2013.01); G02F 1/11 (2013.01); G02F 1/125 (2013.01); G02B 6/122 (2013.01)

(58) Field of Classification Search
CPC .................................................. G02B 6/1225
See application file for complete search history.

(56) References Cited

U.S. PATENT DOCUMENTS

2009/0295505 A1* 12/2009 Mohammadi ......... H01L 41/107
333/191

OTHER PUBLICATIONS

Krauss, T.F., "Slow Light in Photonic Crystal Waveguides", Journal of Physics D: Applied Physics, vol. 40, 2007, pp. 2666-2670.
McNab, et al., "Ultra-low Loss Photonic Integrated Circuit With Membrane-Type Photonic Crystal Waveguides", Optics Express, vol. 11, No. 22, Nov. 3, 2003, pp. 1-13.

(Continued)

*Primary Examiner* — Michelle R Connelly
*Assistant Examiner* — Hoang Tran
(74) *Attorney, Agent, or Firm* — Martin I. Finston

(57) ABSTRACT

The various technologies presented herein relate to various hybrid phononic-photonic waveguide structures that can exhibit nonlinear behavior associated with traveling-wave forward stimulated Brillouin scattering (forward-SBS). The various structures can simultaneously guide photons and phonons in a suspended membrane. By utilizing a suspended membrane, a substrate pathway can be eliminated for loss of phonons that suppresses SBS in conventional silicon-on-insulator (SOI) waveguides. Consequently, forward-SBS nonlinear susceptibilities are achievable at about 3000 times greater than achievable with a conventional waveguide system. Owing to the strong phonon-photon coupling achievable with the various embodiments, potential application for the various embodiments presented herein cover a range of radiofrequency (RF) and photonic signal processing applications. Further, the various embodiments presented herein are applicable to applications operating over a wide bandwidth, e.g. 100 MHz to 50 GHz or more.

5 Claims, 13 Drawing Sheets

(56) References Cited

OTHER PUBLICATIONS

Rakich, et al., "Tailoring Optical Forces in Waveguides Through Radiation Pressure and Electrostrictive Forces", Optics Express, vol. 18, No. 14, Jul. 5, 2010, pp. 1-15.

Rakich, et al., "Giant Enhancement of Simulated Brillouin Scattering in the Subwavelength Limit", Physics Review X, Jan. 30, 2013, pp. 1-15.

Shin, et al., "Tailorbale Stimulated Brillouin Scattering in Nanoscale Silicon Waveguides", Nature Communications, Jun. 6, 2013, pp. 1-10.

* cited by examiner

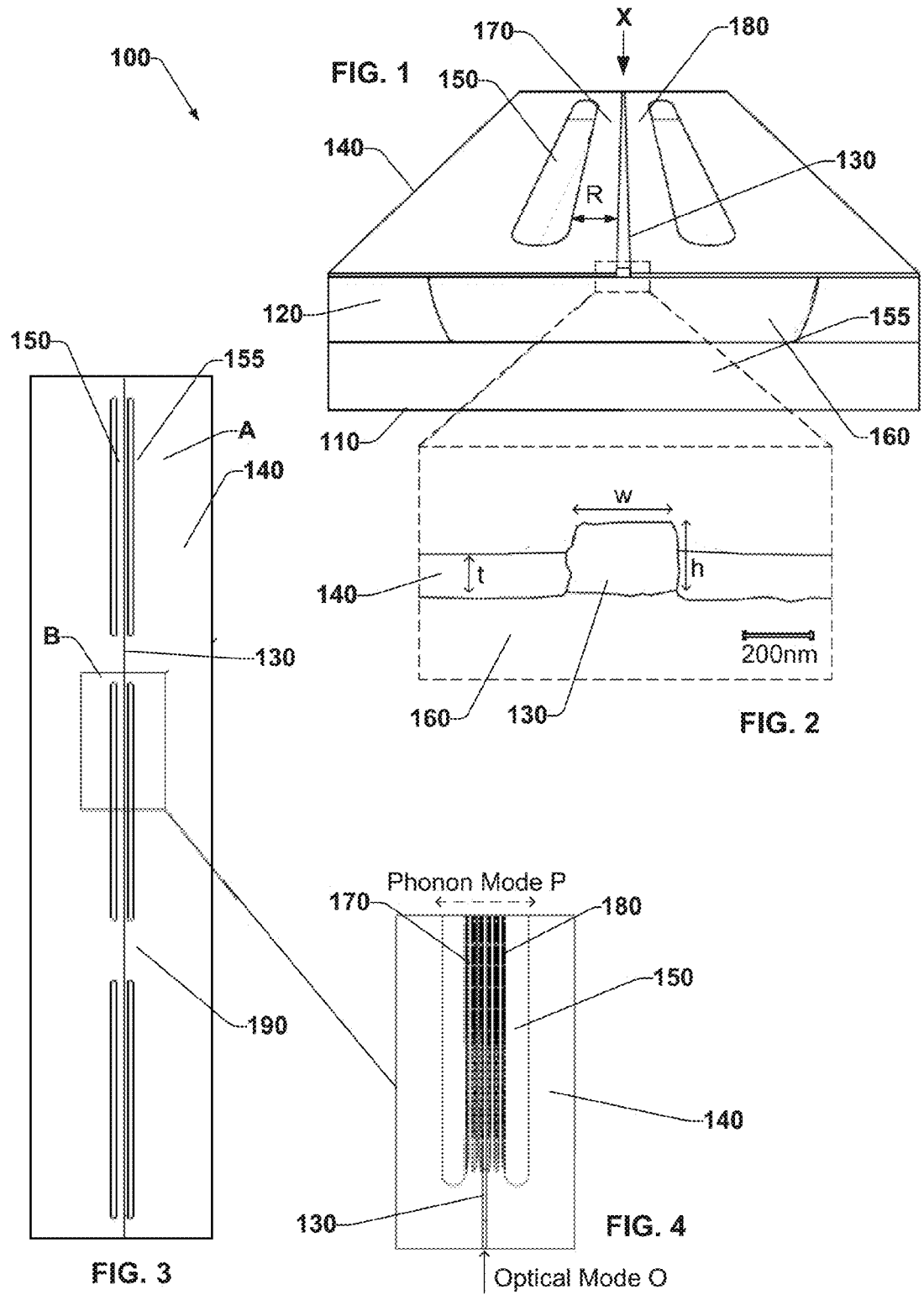

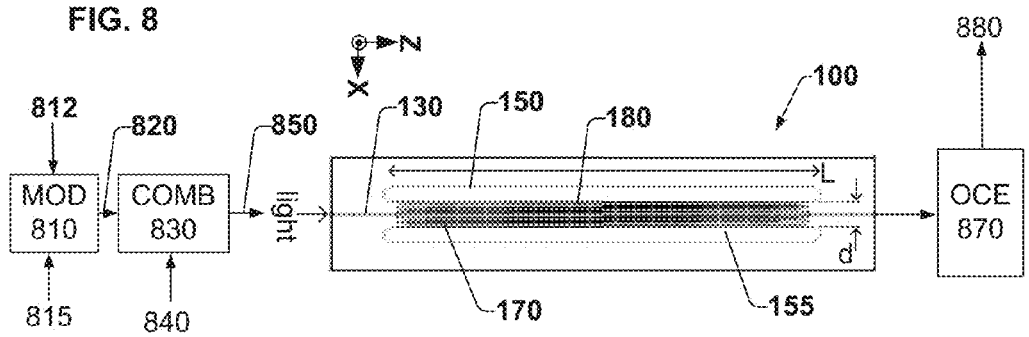
FIG. 8
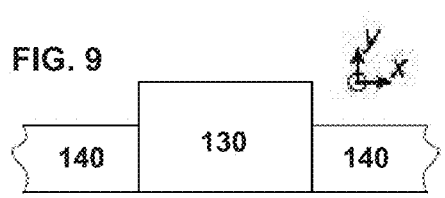
FIG. 9
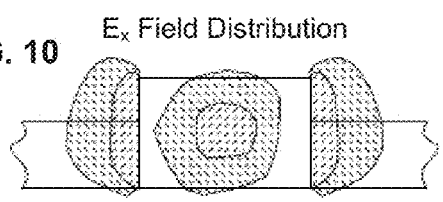
FIG. 10   $E_x$ Field Distribution
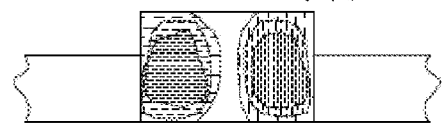
FIG. 11   ES force density (x)
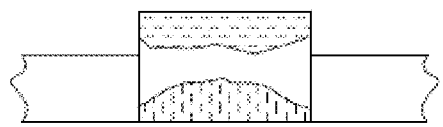
FIG. 12   ES force density (y)
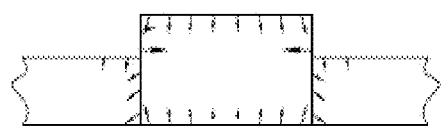
FIG. 13   ES Boundary Force
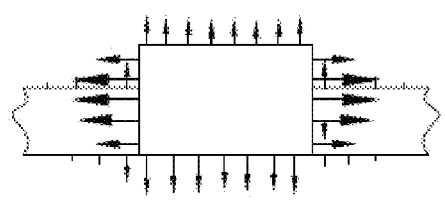
FIG. 14   RP Boundary Force

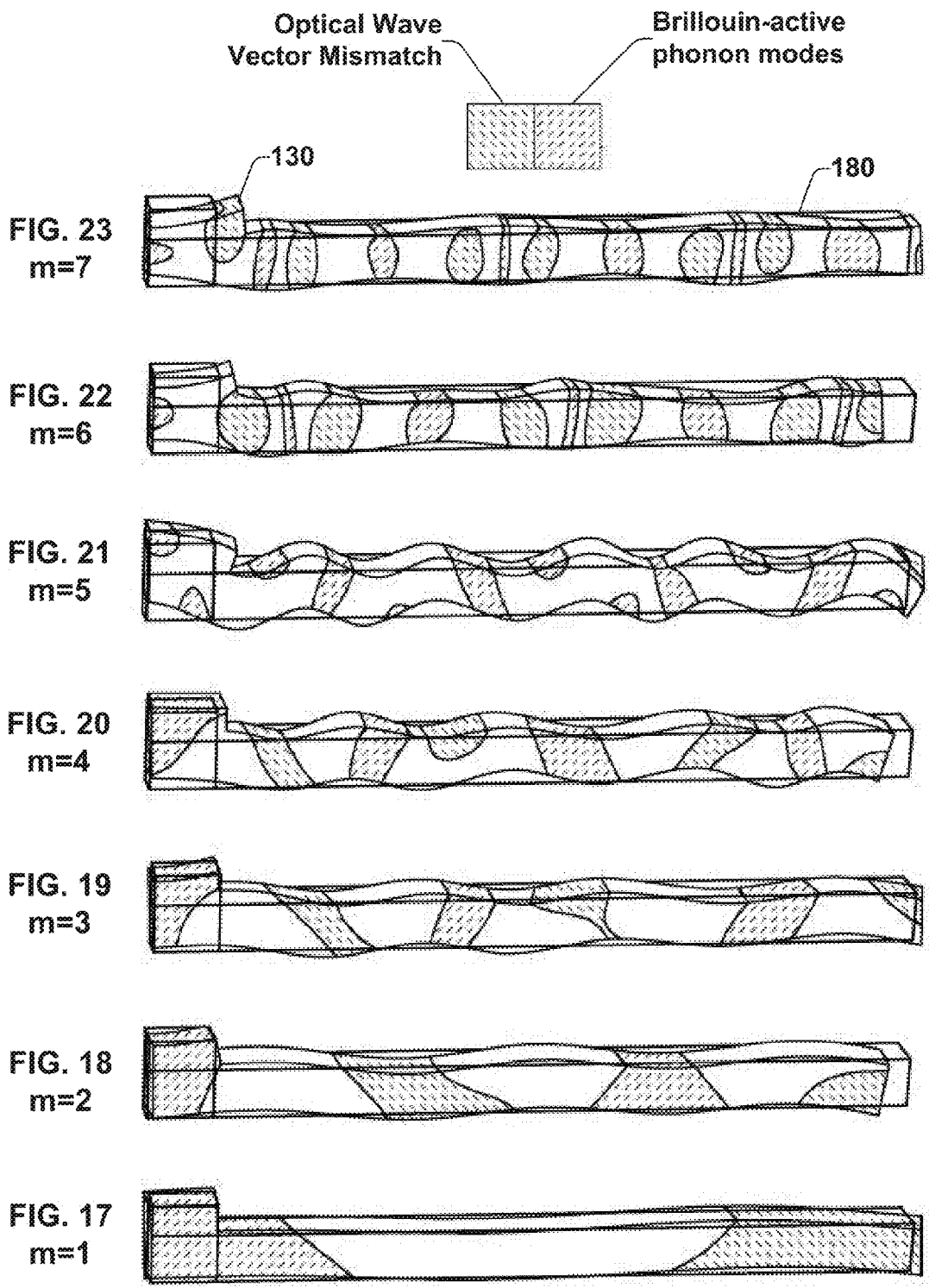

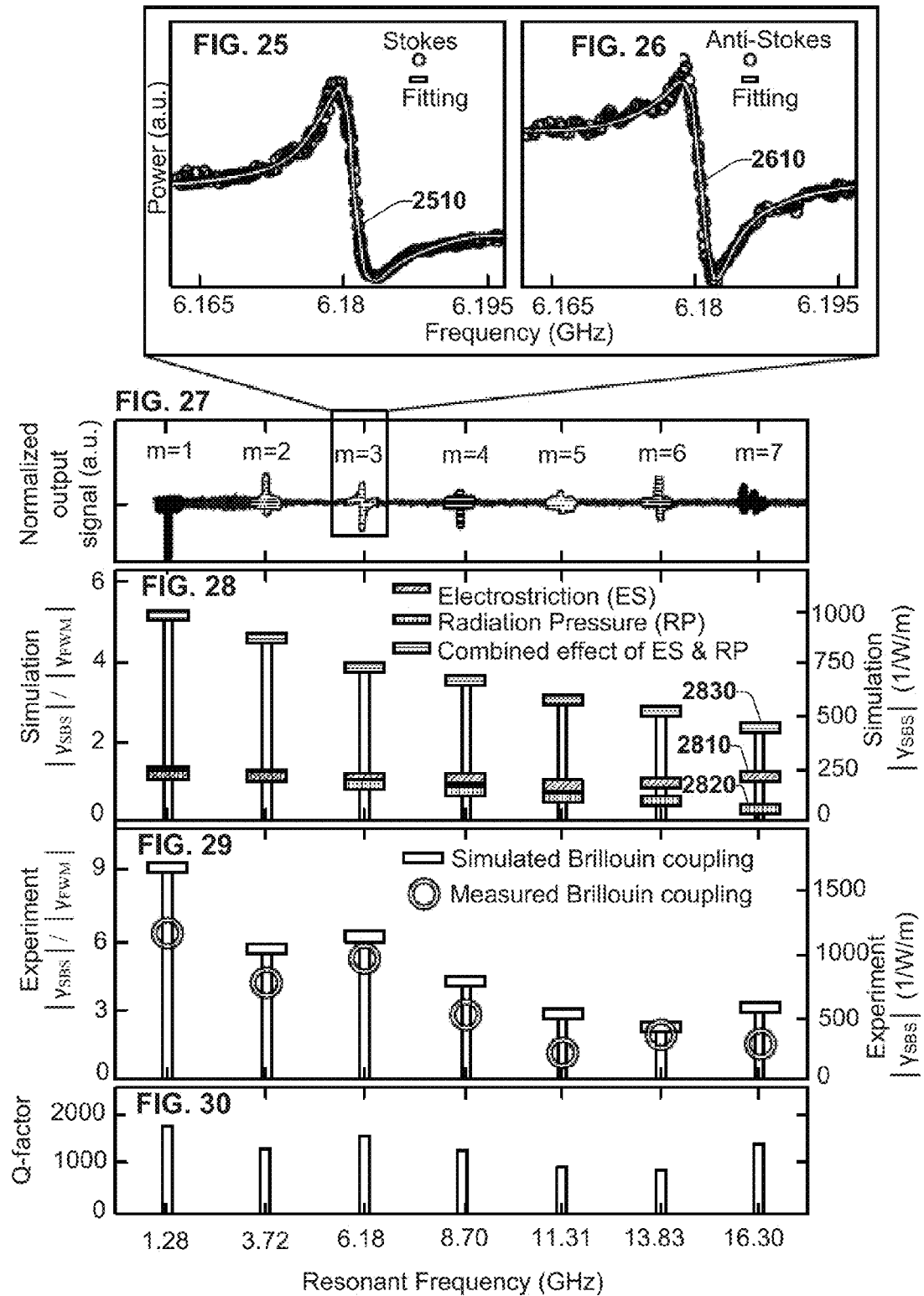

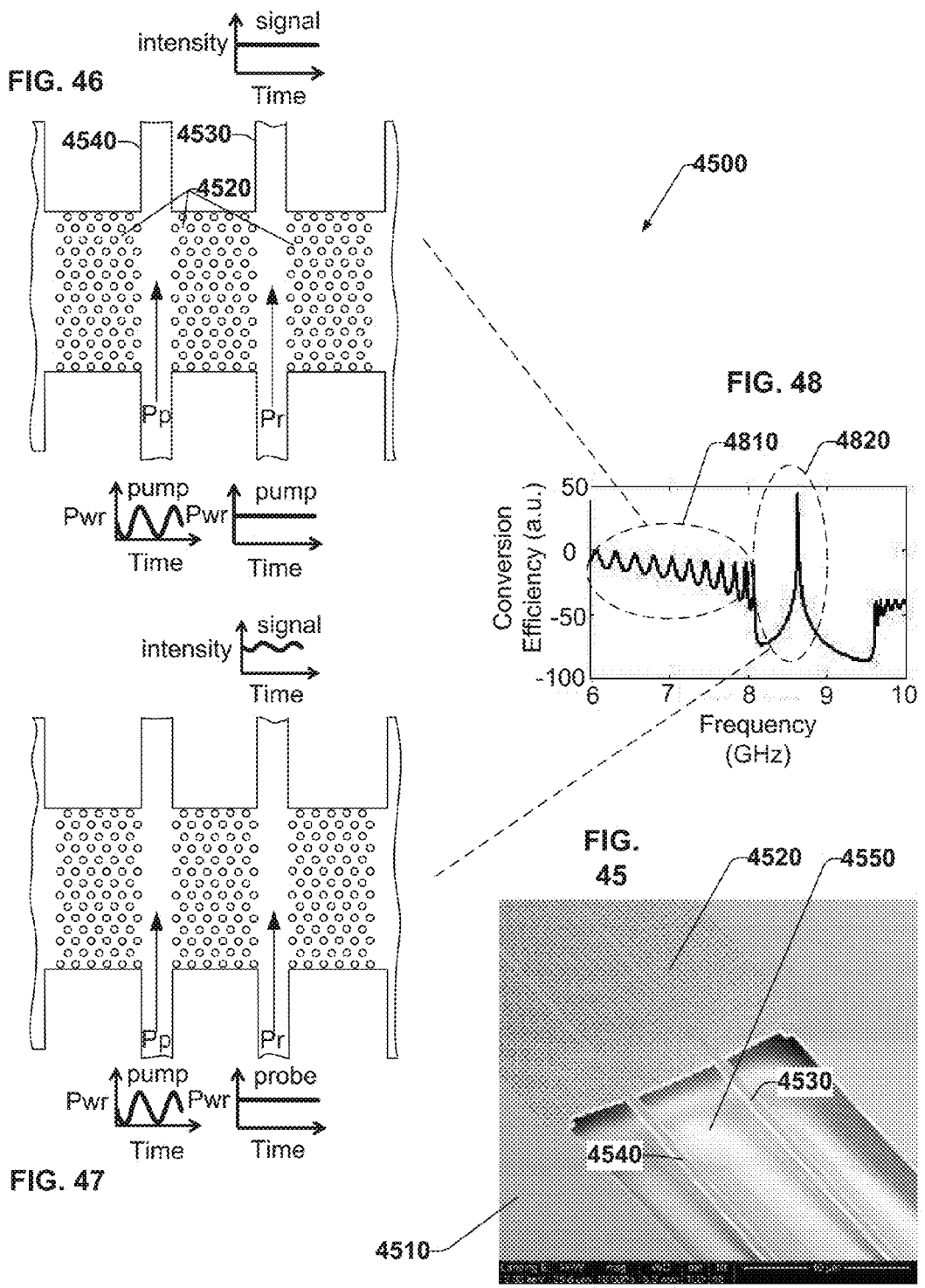

US 9,268,092 B1

GUIDED WAVE OPTO-ACOUSTIC DEVICE

RELATED APPLICATION

This application claims priority to U.S. Provisional Patent Application No. 61/785,163 filed on Mar. 14, 2013, entitled "GUIDED WAVE OPTO-ACOUSTIC DEVICE AND METHODS FOR MAKING THE SAME", the entirety of which is incorporated herein by reference.

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Photon-phonon coupling through guided-wave stimulated Brillouin scattering (SBS) is finding application in numerous technology fields such as tailorable slow light, radio frequency (RF)-photonic signal processing, narrow-line-width laser sources, RF-waveform synthesis, optical frequency comb generation, etc. Realization of this form of travelling-wave photon-phonon coupling in a silicon-based and CMOS (complementary metal-oxide-semiconductor)-compatible platform can enable high-performance signal-processing applications through nanoscale Brillouin interactions. Nanoscale modal confinement can enhance non-linear light-matter interactions within silicon waveguides and in nanooptomechanics. For instance, tight optical confinement in nanoscale silicon waveguides can be responsible for greatly enhanced Raman and Kerr non-linearities, and for new sensing, actuation and transduction mechanisms based on optical forces within nano-optomechanical systems.

The field of cavity optomechanics has produced a wide variety of systems with enhanced and controllable forms of photon-phonon coupling. Specifically, silicon (Si)-based cavityoptomechanical systems have enabled powerful new forms of quantum state transfer, slow light, phonon lasers and optomechanical ground-state cooling. Such cavity systems exploit resonantly enhanced coupling between discrete photonic and phononic modes. As a fundamental complement to cavity systems, guided-wave Brillouin processes can produce coupling between a continuum of photon and phonon modes for a host of wideband (e.g., 0.1-34 GHz) RF and photonic signal-processing applications. For example, travelling-wave Brillouin processes have enabled unique schemes for optical pulse compression, pulse and waveform synthesis, coherent frequency comb generation, variable bandwidth optical amplifiers, reconfigurable filters and coherent beam-combining schemes. Although there are numerous applications and opportunities for chip-scale Brillouin technologies, the ability for conventional systems to achieve Brillouin processes in silicon nanophotonics has proven difficult; strong Brillouin nonlinearities require large optical forces and tight confinement of both phonons and photons, conditions that are not met in conventional Si waveguides.

SUMMARY

The following is a brief summary of subject matter that is described in greater detail herein. This summary is not intended to be limiting as to the scope of the claims.

Various exemplary embodiments presented herein relate to photon-phonon coupling through a guided-wave stimulated Brillouin scattering. In an exemplary embodiment an apparatus is presented, the apparatus comprising a suspended membrane, whereby at least one optical waveguiding member is included in the membrane and at least partially extensive in a longitudinal optical propagation direction. The apparatus further comprising at least one phononic resonator defined in the membrane, extensive in said longitudinal direction, and traversed by the optical waveguiding member.

Another exemplary embodiment is presented comprising a method for forming photon-phonon coupling waveguide device, the method comprising depositing an insulating layer on a substrate whereupon a waveguiding member is subsequently formed on the insulating layer. A membrane layer can be deposited on the insulating layer and on the waveguiding member such that the deposited membrane layer abuts and overlies the waveguiding member. The method further comprising removing such of the membrane layer as overlies the waveguiding member. The membrane layer can be patterned so as to define therein at least one longitudinally extensive phononic resonator traversed by the waveguiding member. The method further comprising removing at least a portion of the insulating layer that underlies the membrane layer, including such portion as underlies the longitudinally extensive phononic resonator or resonators.

A further exemplary embodiment for photon-phonon coupling in a waveguide device can comprise a method which can include injecting a first optical pulse and a second optical pulse into a waveguide core, wherein the waveguide core is supported on a membrane, the first pulse and the second pulse combining to facilitate creation of one or more phonons, the phonon propagating through the membrane in a direction transverse to an optical direction of the waveguide core and the propagating of the phonon causing amplification of the second pulse.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 1 is a schematic diagram of a waveguide device, according to an embodiment.

FIG. 2 is a scanning electron micrograph of a waveguide core and membrane, according to an embodiment.

FIG. 3 is a scanning electron micrograph of a waveguide device comprising a plurality of waveguide regions, according to an embodiment.

FIG. 4 is a schematic of phonons being formed tranverse to a direction of an optical wave, according to an embodiment.

FIG. 8 is a schematic of phonons being formed tranverse to a direction of an optical wave, according to an embodiment.

FIG. 9 presents a cross-section through a waveguide and membrane regions, according to an embodiment.

FIG. 10 depicts a computed $E_x$ optical field distribution of the optical mode, according to an embodiment.

FIG. 11 depicts a x-component of an electrostrictive (ES) force density generated within a waveguide, according to an embodiment.

FIG. 12 depicts a y-component of an electrostrictive (ES) force density generated within a waveguide, according to an embodiment.

FIG. 13 presents a schematic of an electrostrictive induced boundary force produced by an optical mode, according to an embodiment.

FIG. 14 presents a schematic of a radiation pressure (RP)-induced boundary force produced by an optical mode, according to an embodiment.

FIG. 17 depicts a displacement field associated with a phasematched Brillouin-active guided wave for a first mode, according to an embodiment.

FIG. 18 depicts a displacement field associated with a phasematched Brillouin-active guided wave for a second mode, according to an embodiment.

FIG. 19 depicts a displacement field associated with a phasematched Brillouin-active guided wave for a third mode, according to an embodiment.

FIG. 20 depicts a displacement field associated with a phasematched Brillouin-active guided wave for a fourth mode, according to an embodiment.

FIG. 21 depicts a displacement field associated with a phasematched Brillouin-active guided wave for a fifth mode, according to an embodiment.

FIG. 22 depicts a displacement field associated with a phasematched Brillouin-active guided wave for a sixth mode, according to an embodiment.

FIG. 23 depicts a displacement field associated with a phasematched Brillouin-active guided wave for a seventh mode, according to an embodiment.

FIG. 25 is a high-resolution spectral scans of a line shape of a characteristic Brillouin resonance decomposed to its Stokes component, according to an embodiment.

FIG. 26 is a high-resolution spectral scans of a line shape of a characteristic Brillouin resonance decomposed to its anti-Stokes component, according to an embodiment.

FIG. 27 presents a plurality of resonances spanning a range of frequencies, according to an embodiment.

FIG. 28 presents contributions of ES forces, radiation pressure and thermoelastic expansion to a total SBS nonlinear coefficient for a plurality of phonon resonance modes, according to an embodiment.

FIG. 29 presents peak values for measured and simulated Brillouin coupling for a plurality of resonances, according to an embodiment.

FIG. 30 presents peak values for a phononic Q-factor for a plurality of resonances, according to an embodiment.

FIG. 45 is a scanning electron micrograph of a dual photonic crystal waveguide, according to an embodiment.

FIG. 46 is a schematic of a dual photonic crystal waveguide operating below a bandgap frequency, according to an embodiment.

FIG. 47 is a schematic of a dual photonic crystal waveguide operating at a bandgap frequency, according to an embodiment.

FIG. 48 is a chart illustrating conversion efficiency versus frequency for a dual photonic crystal waveguide, according to an embodiment.

DETAILED DESCRIPTION

Figure 5:
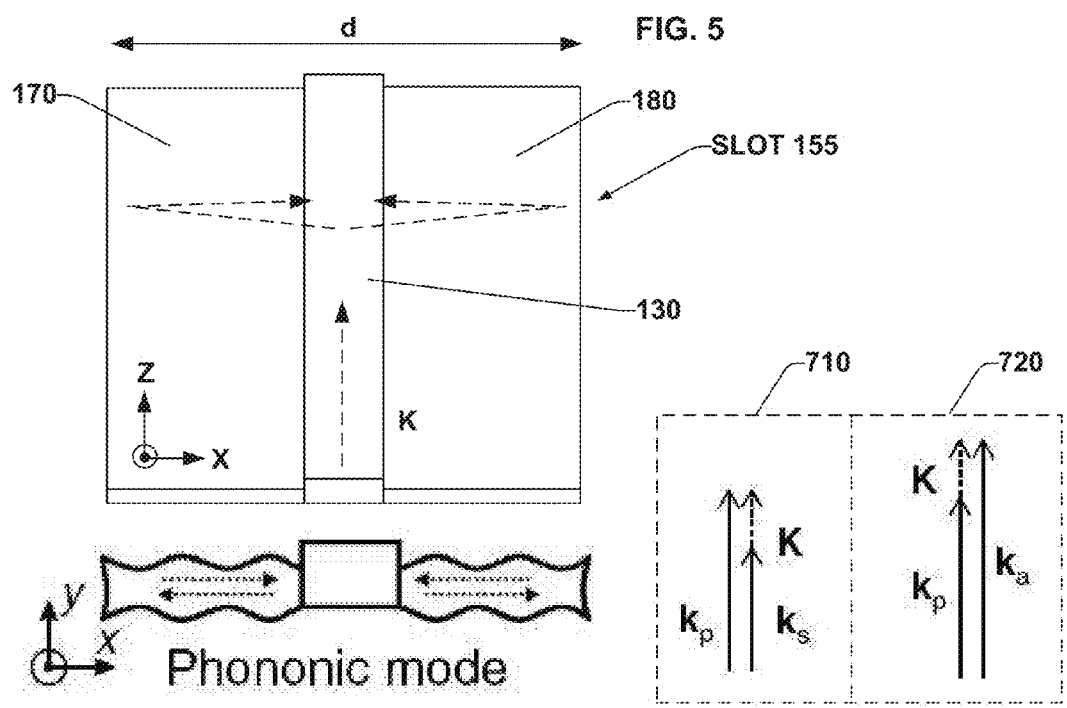
FIG. 5 illustrates propagation of a guided elastic phonon mode at a waveguide and across respective membrane regions, according to an embodiment.

Various technologies are presented herein relating to photon-phonon coupling through a guided-wave stimulated Brillouin scattering (SBS), wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

The various embodiments presented herein relate to various hybrid phononic-photonic waveguide structures that can exhibit nonlinear behavior associated with traveling-wave forward stimulated Brillouin scattering (forward-SBS). The various structures can simultaneously guide photons and phonons in a suspended membrane. By utilizing a suspended membrane, it is possible to eliminate a substrate pathway for loss of phonons that suppresses SBS in conventional siliconon-insulator (SOI) waveguides. Consequently, forward-SBS nonlinear susceptibilities are achievable with a Brillouin nonlinear coefficient that is more than about 3000 times greater than achievable with a conventional waveguide system. Owing to the strong phonon-photon coupling achievable with the various embodiments herein, potential application for the various embodiments presented herein cover a range of radiofrequency (RF) and photonic signal processing applications, including pulse compression, pulse and waveform synthesis, coherent frequency comb generation, optical amplification, optical filtration, coherent beam combining, etc. Further, the various embodiments presented herein are applicable to applications operating over a wide bandwidth, e.g. 100 MHz to 50 GHz or more.

Further presented herein is experimental data related to measuring the Brillouin nonlinearity of a waveguide, whereby pump radiation at 1556 nm was intensity modulated at a variable RF frequency $\Omega/2$ to produce two sidebands respectively upshifted and downshifted by the RF frequency. The modulated pump radiation was mixed with probe radiation at 1536 nm and injected into the waveguide. Interference between the sidebands at the beat frequency $\Omega$ produced Stokes and anti-Stokes shifted probe radiation by forward-SBS at values of $\Omega$ that correspond to phononic resonances. The waveguide output was filtered to remove the pump radiation, and the frequency-shifted probe radiation was measured in a heterodyne detector that combined the filtered waveguide output with a local oscillator signal produced by imposing a small frequency offset on a tapped-off portion of the 1536-nm probe radiation.

FIGS. 1-4 illustrate various views and sections of a waveguide device 100 configured to facilitate photon-phonon coupling through a guided-wave stimulated Brillouin scattering (SBS), according to an embodiment. Waveguide device 100 can comprise a Brillouin-active membrane waveguide (also referred to as a BAM waveguide). FIG. 1 is an end-on, 3-dimensional representation of the waveguide device 100, taken from region A of FIG. 3. FIG. 2 is a scanning electron micrograph of a waveguide core region comprising a waveguide core 130 and adjacent membrane 140. FIG. 3 is scanning electron micrograph of a top down view in direction X, depicting a portion of a waveguide device 100 comprising, in series, three identical membrane-suspended regions. Region A indicates the location of FIG. 1 relative to FIG. 3, and region B indicates the location of FIG. 4 relative to FIG. 3. FIG. 4 illustrates an optical wave being transmitted into a waveguide device 100 and the resulting phonon distribution occurring in phonic regions 170 and 180. A shown in FIGS. 1-4, device 100 can comprise a substrate 110, having formed thereon an insulator layer 120. Located over a cavity 160 formed in the insulator layer 120, is a membrane 140, wherein membrane layer 140 has a plurality of slots 150 and 155, with membrane regions 170 and 180 juxtaposing a waveguide core 130.

Any suitable material can be utilized for the respective structural elements comprising waveguide device 100. For example, substrate 110 can be formed from silicon (Si), insulator layer 120 can be formed from silicon dioxide, $SiO_2$, waveguide 130 can be formed from any suitable waveguide forming material, such as Si, and membrane 140 can be formed from silicon nitride ($Si_3N_4$), whereby the membrane layer 140 can be in a state of tension. In an embodiment, waveguide 130 can be nanophotonic, and further can have dimensions width w=313 nm and height h=194 nm, while membrane 140 can have a thickness t=124 nm.

As described further herein, slots 150 and 155 can be utilized to facilitate formation of a cavity 160. Slots 150 and 155 can be further utilized to effectively operate as a reflector of acoustic waves having wavevectors substantially transverse (e.g., direction P) to an optical propagation direction (e.g., direction O). Hence each pair of slots (e.g., slots 150 and 155) can form an acoustic resonator capable of defining a series of discrete phononic resonances in at least the range of 1-18 GHz. In the exemplary embodiment, slots 150 and 155 can be 2 µm wide by 100 µm long. Hence, regions 170 and 180 are accordingly truncated on either side of the waveguide 130 by the symmetrically placed slots 150 and 155. The geometry of device 100 can facilitate independent control of the photonic and phononic properties of a Brillouin waveguide, enabling the phonon mode spectrum to be tailored independently from the optical force distributions within the core of the waveguide 130.

Figure 7:
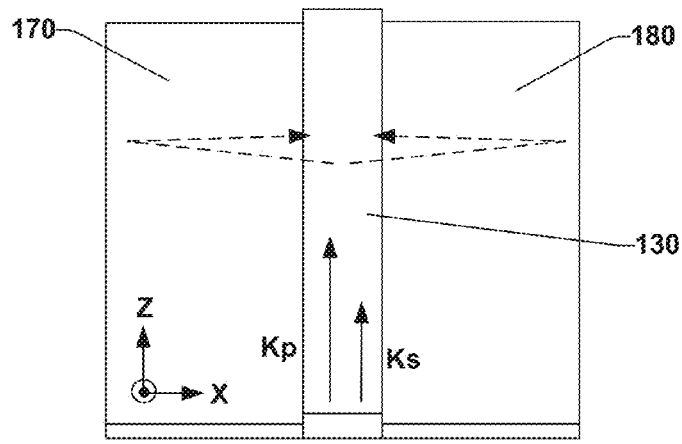
FIG. 7 presents vector phase matching diagrams for respective Stokes and anti-Stokes forward-stimulated Brillouin scattering, according to an embodiment.
Figure 6:
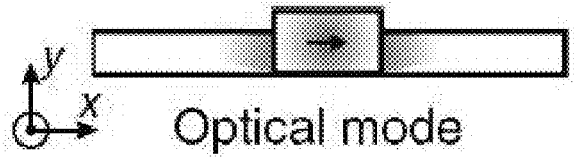
FIG. 6 illustrates propagation of an optical mode at a waveguide and across respective membrane regions, according to an embodiment.

FIGS. 5 and 6 illustrate respective propagation of the guided elastic and optical modes at a waveguide 130 and across respective membrane regions 170 and 180. Further, FIG. 7 presents vector phase matching diagrams 710 and 720 for respective Stokes and anti-Stokes forward-stimulated Brillouin scattering, whereby $k_p$ represents the optical pump, $k_s$ represents the Stokes wave-vector, $k_a$ represents the anti-Stokes wave-vector and K is the phonon wave-vector. As shown in FIGS. 5 and 6, phase matching can necessitate a vanishing longitudinal phonon wave-vector through forward-SBS, resulting in standing phonon modes (or slow group velocity resonant guided phononic modes) with large transverse wave-vectors. As further shown in FIGS. 5 and 6, owing to the total internal reflection between Si (n=3.5) comprising the waveguide 130, and $Si_3N_4$ (n=2.0), forming the membrane 140, the respective Si and $Si_3N_4$ regions can act to tightly confine the optical mode of waveguide device 100 to the waveguide core 130. Further, the patterned membrane 140 (e.g., comprising regions 170 and 180 with respective slots 150 and 155) can act to guide and/or confine the generated phonons. The compound-material geometry of waveguide device 100 can provide independent control of the photonic and phononic waveguide dispersion, which can facilitate the phonon modes to be shaped separately from the optical forces within the core of the waveguide 130

FIG. 8 illustrates a schematic 800 of a displacement field of a phonon excited by optical forces within a waveguide device 100 (also referred to as a transversely oriented phonon-resonator optical waveguide (TOPROW)) as a function of intramodal forward SBS through Brillouin coupling between guided transverse-electric-like optical modes. FIG. 8 presents a displacement field of a 3.7 GHZ extended phonon excited by optical forces within waveguide 130 operating in conjunction with a membrane 140. In an embodiment, d=3.8 µm and L=100 µm. A modulator 810 can be configured to modulate pump light 812 received from a pump source in response to a radiofrequency waveform 815 received from a radiofrequency generator. An input combiner 830 can be configured to combine an optical input signal 840 with the modulated pump light 820 and to inject the combined light 850 into an optical waveguiding device 100. Waveguiding device 100 can comprise a waveguide core 130, slots 150 and 155, and phononic regions 170 and 180, as previously described. An output coupling element 870 can be configured to extract an output optical signal 880 from an optical waveguiding device 100.

FIG. 9 presents a cross-section through a waveguide 130 and membrane regions 170 and 180 to facilitate understanding of the following representations. FIG. 10 depicts a computed $E_x$ optical field distribution of the optical mode. Computed electrostriction (ES) force densities are shown in FIGS. 11-13, where FIGS. 11 and 12 present respective x- and y-components of the electrostrictive (ES) force densities generated within the waveguide 130. The force densities are presented for an embodiment where the waveguide 130 comprises Si. FIG. 13 presents electrostrictive induced boundary forces produced by the optical mode. FIG. 14 illustrates a radiation pressure (RP)-induced force density. The respective force densities presented in FIGS. 11-14 can facilitate mediation of Brillouin coupling. Through forward SBS, co-propagating pump and Stokes waves of frequencies $\omega_p$ and $\omega_s$, couple through parametrically generated acoustic phonons of difference frequency $\Omega = \omega_p - \omega_s$. Momentum conservation requires that $k(\omega_p) = K(\Omega) = k(\omega_s)$, where $k(\omega)$ is the optical dispersion relation, and $K(\Omega)$ is the phonon-dispersion relation. Thus, strong photon-phonon coupling is mediated by the set of phonons, $\{\Omega_i\}$, whose dispersion relations satisfy the phasematching condition $\Delta k(\Omega) = k(\omega_p) - k(\omega_p - \Omega) = K(\Omega)$.

Figure 15:
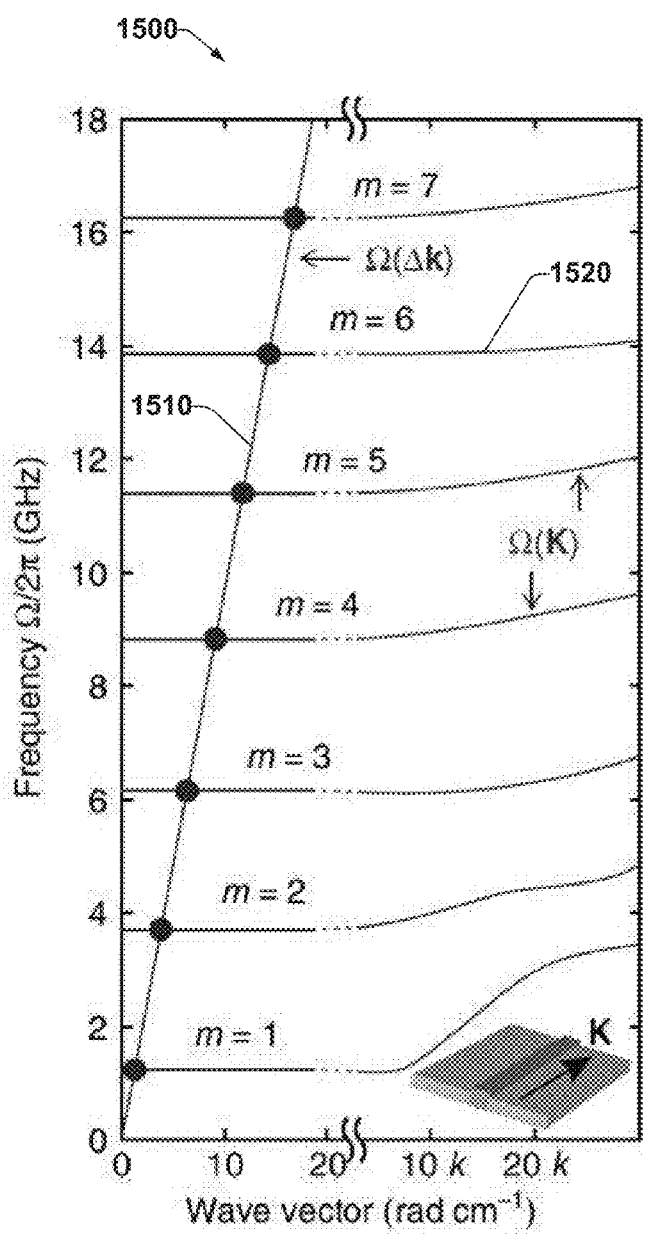
FIG. 15 presents a chart of dispersion curves illustrating phonon frequency versus longitudinal wave vector of various Brillouin-active phonon modes, according to an embodiment.

FIG. 15 presents a chart 1500 of dispersion curves illustrating phonon frequency versus longitudinal wave vector of various Brillouin-active phonon modes, e.g., for a waveguide device 100 having a dimension d=3.8 μm. In an aspect, only the phonon modes (e.g., m=1, m=2, ... m=7) that exhibit strong Brillouin coupling through good overlap between an elastic displacement field and an optical force distribution are shown. Plot 1510 presents the optical wave vector mismatch, $\Delta k(\Omega)$, which is plotted atop the various plots 1520 of phononic dispersion relation, $K(\Omega)$. For small wave vectors (e.g., on the left of FIG. 15), the phase-matched phonons, as presented as circles on FIG. 15, are identified by the intersection between the optical wave vector mismatch (e.g., diagonal plot 1510) and the Brillouin-active phonon modes (e.g., respective horizontal lines 1520 marked m=1, m=2, ... m=7). The points of intersection between plots 1510 and respective plots 1520 for each m=1-7 identify the $\Omega$- and K-values of the phase-matched phonon modes. Numerous phase-matched phonon modes m=1-7 are presented with evenly spaced frequencies spanning 1-16 GHz, and corresponding values of |K| of between 1.3 and 17 rad cm$^{-1}$. In an aspect, the waveguide device 100 can comprise a number of periodic-array Brillouin-active suspended regions, as seen by the SEM micrograph of FIG. 3. If the spatial period of a waveguide is smaller than the longitudinal period of the guided phonon wave vector ($2\pi/|K|$), the phase-matching conditions will be unaffected. Here, that is true as the spatial period of the waveguide modulation (e.g., 125 μm) is more than 20 times smaller than the longitudinal period of the guided phonon wave vector.

On the basis of the phase-matching condition and the relation $|\Delta K(\Omega)| \cong (\partial |k|/\partial \omega)\Omega = (\Omega/v_g)$, only guided phonons with phase velocities matching the group velocity of light ($v_g$) produce resonant coupling through forward SBS. Such an effect can be a result of the interference between the co-propagating pump and Stokes waves. In an embodiment, the interference yields modulated energy density and force density distributions that propagate along the waveguide at the group velocity ($v_g$) of light. As this travelling-force distribution drives photon-phonon coupling, only phonons with phase velocities ($\Omega/K$) matching the group velocity ($v_g$) of light can produce efficient coupling (e.g., as presented as circles in FIG. 15). These ultra-high phase-velocity-guided phonon modes (e.g., of about $10^8$ ms$^{-1}$) have corresponding guided phonon group velocities ($\partial \Omega/\partial K$) that are exceedingly slow (~1 ms$^{-1}$), but are non-zero.

Figure 16:
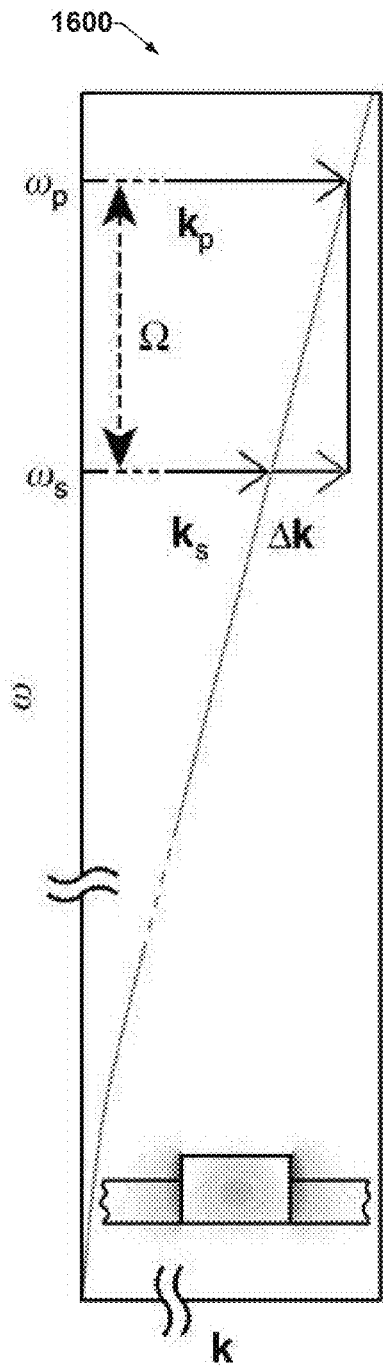
FIG. 16 presents a representation of an optical wave vector mismatch, $\Delta k$, produced by the dispersion of the optical waveguide mode, $\omega(k)$, as pump and Stokes waves are detuned, according to an embodiment.

The displacement field associated with each of the phase-matched Brillouin-active guided wave modes, m=1-7, are shown in FIGS. 17-23. Labeling of each mode (e.g., m=1, m=2, ... m=7) is according to the mode index identified in FIG. 15. Further, the right half membrane region 180 of each displacement field is shown in each of FIGS. 17-23. The symmetric force distributions, as presented in FIGS. 11-14, permit coupling of photons in the waveguide core 130 to phonons with symmetric displacement fields about the waveguide core 130. Hence, it can be considered that the membrane regions 170 will undergo the same effects as the illustrated modes of FIGS. 17-23. Periodic boundary conditions can be applied to the z-normal faces of the simulations to facilitate computation of the displacement fields of the phase-matched phonon modes presented in FIGS. 17-23 and the corresponding phonon-dispersion curves in FIG. 15. Although these guided elastic modes can exhibit some flexural character, the vast majority of the modal potential energy can be ascribed to in-plane elastic compression (e.g., FIG. 8, directions x-z). The compressive character of these slow group velocity-guided modes can be most clearly seen in the high frequency limit, as demonstrated by the displacement fields of FIG. 22, m=6, and FIG. 23, m=7. For small K-values, the z-component of the phonon displacement field can become much smaller than the x-component. Moreover, in the limiting case where the waveguide possesses vertical symmetry (e.g., FIG. 2, where t=h), then the Brillouin-active modes can converge to symmetric Lamb waves with nearly identical dispersion curves to those presented in FIG. 16. FIG. 16, is a representation of an optical wave vector mismatch, $\Delta k$, produced by the dispersion of the optical waveguide mode, $\omega(k)$, as pump and Stokes waves are detuned. Accordingly, the waves can be classified as symmetric Lamb waves, producing equal frequency spacing of the phase-matched Brillouin modes, as shown in FIG. 15.

Full-vectorial multi-physics simulations based on waveguide device 100 were performed and conveyed the elastic wave motion for seven characteristic Brillouin-active phonon modes. Periodic boundary conditions were applied to the z-normal faces of the simulation domains of FIGS. 17-23 to facilitate capture of the nature of a respective travelling-wave for the guided phonons at the phase-matched K-values identified in FIG. 15. Accordingly, FIGS. 17-23 present seven characteristic Brillouin-active phonon modes, m=1-7 at respective frequencies 1.28, 3.72, 6.18 GHz, etc. As previously mentioned, in an aspect, the phonon modes presented in FIGS. 17-23 can be considered corresponding to symmetric Lamb waves.

Based upon the foregoing, a waveguide device 100 was formed with a series of 26 reflector pairs (e.g., 26 pairs of slots 150 and 155) along the path traversed by an optical waveguide 130, to facilitate formation of a Brillouin-active length of 3.3 mm in a total device length of 4.9 mm. In an aspect, a 3.3 mm Brillouin-active device length coincides with a total non-linear phase mismatch, $|\Delta K|\cdot L$, of between 0.45 and 5.7 radian for the range of Brillouin-active modes presented in FIGS. 17-23. In an embodiment, each suspended waveguide section (e.g., a length of waveguide core 130 that has an adjacent slot 150 and 155) is separated by a 25 μm anchored (or unsuspended) region, as indicated by FIG. 3, region M. In an embodiment, waveguide device 100 produces a significant non-linear phase mismatch along its length. Hence, the various embodiments relating to waveguide device 100 can be treated as a phase-matched travelling-wave process to facilitate describing the coherent addition of non-linearities along the entire length of the waveguide 130 in waveguide device 100.

A plurality of waveguide devices 100 have been studied with waveguide widths, w, ranging from 0.8-3.8 mm, which produced a range of Brillouin resonances over a frequency range of 1-18 GHz. As an optical group velocity, $v_g$, changes by only a few percent over a 30-nm wavelength range, the optical phase mismatch (with values, $|\Delta K| \cdot L \le 2\pi$) can have negligible change over an appreciable wavelength range. Accordingly, the same guided phonon can be excited by continuum of different wavelengths within the waveguide device 100, even though the waveguide device 100 can operate as a phase-matched non-linear process. Such operation enables waveguide device 100 to operate with pump and probe waves of disparate wavelengths to couple to each other through the Brillouin-active modes of a single waveguide device 100.

Figure 24:
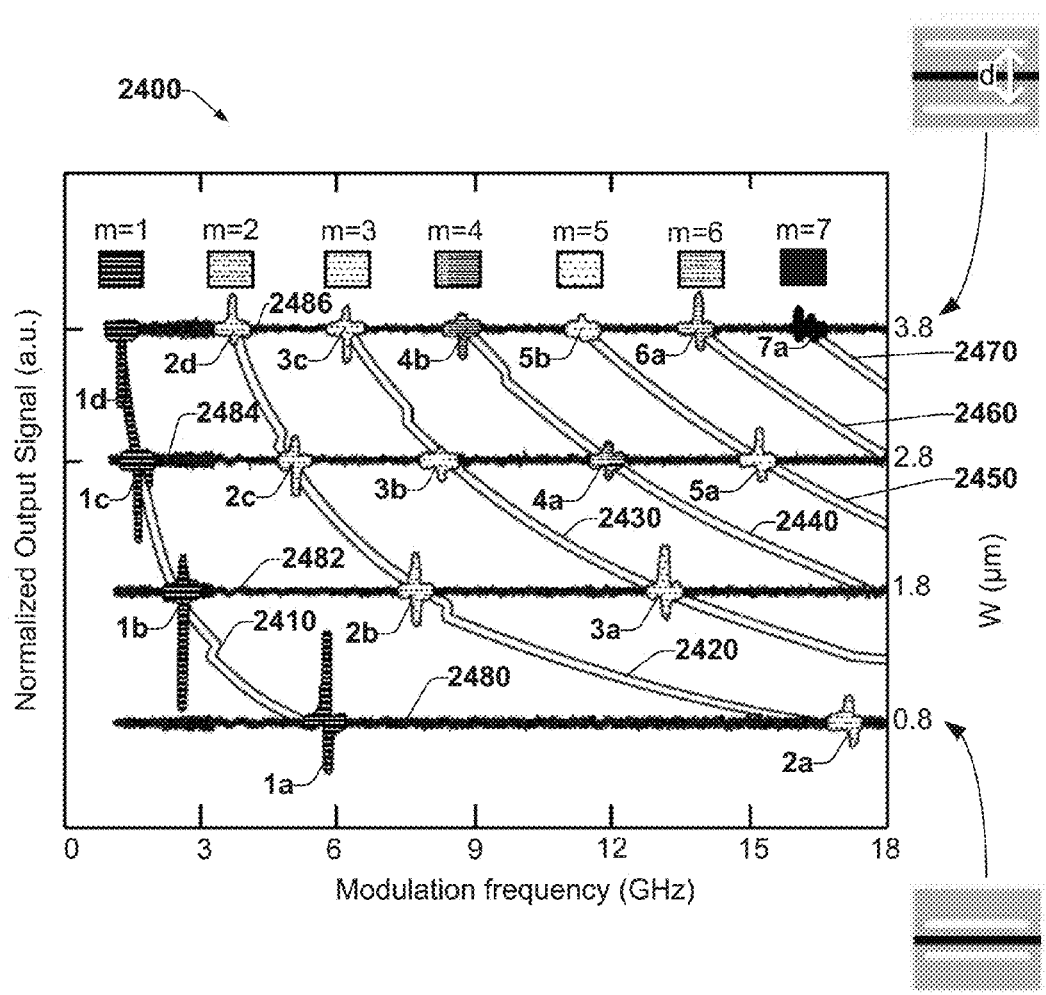
FIG. 24 presents signatures of non-linear Brillouin response as a function of pump signal modulation, according to an embodiment.

To facilitate further understanding, FIG. 24 presents data derived from testing of a waveguide device 100, wherein, as previously mentioned, the waveguide device 100 was formed to comprise 26 reflector pairs (e.g., slots 150 and 155) along the path traversed by an optical waveguide 130, to facilitate formation of a Brillouin-active length of 3.3 mm in a total device length of 4.9 mm. Experimental studies of a Brillouin non-linearity were performed with a heterodyne FWM apparatus, facilitating direct measurement of the third-order non-linear susceptibility. During the FWM experiments, a modulated pump signal (e.g., 1,556 nm) and continuous-wave probe signal (e.g., 1,536 nm) are injected into a waveguide 130 of waveguide device 100. The modulated pump signal can drive the excitation of Brillouin-active phonons over a wide range of frequencies as the pump modulation frequency is swept through a range of values. The non-linear response of the waveguide device 100 can be subsequently analyzed by heterodyne measurement of optical tones imprinted on the disparate probe wavelength as a result of a coherent combination of the Brillouin and third-order electronic non-linear susceptibilities (e.g., through FWM). Any signal sidebands can then be analyzed as distinct RF tones through heterodyne interferometry. Such an approach enables the Stokes and anti-Stokes signatures to be resolved separately.

As presented in FIG. 24, signatures showing a non-linear Brillouin response can be observed by measuring an intensity of non-linearly induced sidebands imprinted on a probe signal, as the frequency of a pump modulation signal was swept from 1 to 18 GHz. The spectra in FIG. 24 were obtained by integrating the RF power produced by heterodyne detection of a probe signal (including both Stokes and anti-Stokes sidebands) over a discrete set of high-frequency RF bands using RF filters. To remove the frequency dependence of the detection system and to more clearly exhibit the sharp Brillouin resonances, the spectra in FIG. 24 were normalized to those of an identical optical waveguide without a Brillouin-active region. Each waveguide produces a series of regularly spaced Brillouin resonances analogous to those identified in FIGS. 17-23.

Owing, in part, to a spatial symmetry of the optical force distribution, only phonon modes with even displacement symmetry, with respect to the waveguide core 130, produce efficient Brillouin coupling. A total of 17 resonances are presented in FIG. 24, where each respective resonance from 1a, 1b, . . . 2a, 2b, . . . 7a, is connected by mode order plots, where: plot 2410 is mode m=1, plot 2420 is mode m=2, plot 2430 is mode m=3, plot 2440 is mode m=4, plot 2450 is mode m=5, plot 2460 is mode m=6, and plot 2470 is mode m=7, to indicate the mode order of each phononic resonance as the Brillouin spectrum shifts with waveguide dimension.

As shown in FIG. 24, four waveguide devices 100 are presented with respective waveguide dimension width d, where plot 2480 d=0.8 μm, plot 2482 d=1.8 μm, plot 2484 d=2.8 μm, and plot 2486 d=3.8 μm, where width d is the phononic distance between two opposite slits (e.g., slits 150 and 155), as shown in FIG. 8. The 17 resonances are observed as the frequency is swept between 1 and 18 GHz.

As shown, plots 2410-2460 are also simulated mode frequencies over the range of device dimensions, and good agreement occurs between the observed resonances and the anticipated values (e.g., an anticipated value occurring where a mode plot 2410-2460 intersects a waveguide dimension plot 2480-2486).

FIG. 24 illustrates that a variation of the cavity dimension (e.g., width d) enables precise placement of Brillouin resonances at any frequency from 1 to 18 GHz, with a high degree of non-linear tailorability. For example, the m=2 resonance (plot 2420) is shifted from about 3.7 to about 17 GHz, as the cavity dimension, d, is varied from 3.8 μm to 0.8 μm. It is to be noted that while bandwidth limitations of the testing apparatus did not permit measurements beyond 18 GHz, strong Brillouin resonances are expected at 50 GHz and higher frequencies.

With further reference to the resonance signatures presented in FIG. 24, a Fano-like line shape can be seen to be produced by each Brillouin resonance, from which the magnitude of the Brillouin non-linear coefficient, $\gamma_{SBS}$, can be obtained. The Fano-like line shape can be seen in the high-resolution spectral scans of FIGS. 25 and 26, which show the line shape of a characteristic Brillouin resonance (f=6.185 GHz, with d=3.8 μm) decomposed into its Stokes (e.g., FIG. 25) and anti-Stokes (e.g., FIG. 26) components. The data presented was obtained by spectrally resolving distinct heterodyne tones of the Stokes and anti-Stokes signals using a high-resolution RF spectrum analyzer as the pump modulation frequency was swept from about 6.16 GHz to about 6.2 GHz. The asymmetric line shapes shown in plots 2510 and 2610 result from the coherent interference between the Brillouin and electronic Kerr non-linearities of the waveguide device 100. Involvement of electronic Kerr non-linearities at the Stokes and anti-Stokes frequencies can occur due to cross-phase modulation between a pump beam and a probe beam propagating in the silicon waveguide core 130.

To facilitate determination of the magnitude of the Brillouin nonlinear coefficient, $\gamma_{SBS}$, relative to the intrinsic Kerr non-linear coefficient $\gamma_K$ and the non-linear free-carrier dispersion coefficient $\gamma_{FC}$ from the data presented in FIGS. 24, 25, and 26, non-linear coupled amplitude equations were formulated to derive the functional form of the Stokes and anti-Stokes line shapes. The equations are presented herein as Eqns. 1a-7 below, accompanied with explanatory text.

Owing to SBS being a resonant effect, a SBS non-linear coefficient can form a Lorentzian line shape centred about each Brillouin-active phonon mode. In contrast, the electronic Kerr non-linearities are nonresonant at 1,550 nm wavelengths, yielding a frequency-independent non-linear coefficient. As is known in the art, the frequency-dependent interference between the Kerr and Brillouin effects can produce the asymmetric (e.g., Fano-like) line shape, as shown in plots 2510 and 2610. However, it should be noted that the experimental arrangement utilized to measure the values presented in FIGS. 24-26 is distinct, leading to a different set of coupled amplitude equations. In addition, non-linearly generated free carriers in Si can be responsible for the dissimilar line shapes of the Stokes and anti-Stokes orders, and a larger nonlinear background for frequencies below 2 GHz under the experimental conditions utilized herein. As the free-carrier effects roll off at high frequency, the Kerr responses at 16 GHz are used as a reference to determine the magnitude of the Brillouin non-linear coefficient.

On the basis of the coupled amplitude model described with reference to Eqns. 1a-7, the magnitude of the Brillouin non-linear coefficient, $\gamma_{SBS}$, can be extracted from the experimental line shape of both the Stokes and anti-Stokes signatures of each resonance of the waveguide device 100 having a width d=3.8 μm.

Seven resonances, spanning frequencies from 1.28 to 16.30 GHz, are shown in FIG. 27. The peak value of $|\gamma_{SBS}|/|\gamma_K|$ and the phononic Q-factor of each resonance extracted from experiments (including separately resolved Stokes and anti-Stokes signatures) are shown FIGS. 29 and 30 respectively. The peak value of the Brillouin non-linear coefficient at 1.28 GHz is found to be 6.18 times larger than the Kerr non-linear coefficient of the waveguide (or $|\gamma_{SBS}|/|\gamma_K|=6.18$).

From the established non-linearities of Si, $|\gamma_K|$ of 188±34 $W^{-1} m^{-1}$ were determined for a waveguide device 100 with w=[1.8, 2.8, 3.8] μm (per Eqns. 1-7 herein). From this relative measurement, the Brillouin non-linear coefficient is found to be $|\gamma_{SBS}| \cong 1.164 \pm 244$ $W^{-1} m^{-1}$ over the Brillouin-active region of the waveguide device 100. Moreover, as the Brillouin non-linear coefficient is related to the Brillouin gain as $2 |\gamma_{SBS}|=G_{SBS}$, this nonlinearity corresponds to a forward SBS gain of $G_{SBS} \cong 2,328 \pm 488$ $W^{-1} m^{-1}$.

It is to be noted that much of the ±18% and ±21% uncertainty assigned to $|\gamma_{SBS}|$ and $|\gamma_K|$ values, respectively, can arise from the (±15%) uncertainty in the measured value of the Kerr non-linearity for silicon. Despite the fact that this non-linear response is the aggregate of an ensemble of 26 distinct Brillouin-active suspended regions fabricated along the length of the waveguide device 100 as previously described, high mechanical Q-factors (~1,000) are produced for phonon frequencies of about 1.28 to about 16.3 GHz.

For comparison with experiments, full vectorial three-dimensional multi-physics simulations were performed through coupled optical force and elastic wave finite element analysis and simulation models. The distinct contributions of ES forces (plot 2810, orange), radiation pressure (plot 2820, blue) and thermoelastic expansion to the total SBS nonlinear coefficient (plot 2830, black) are shown in FIG. 28 for each phonon resonance mode m=1-7. A fixed mechanical Q-factor of Q=1,000 is assumed. Note that negligible contribution to the Brillouin coupling is produced by thermoelastic response at these GHz frequencies due to, at least in part, the slow thermal time constant of this system (for further details, refer to Eqns. 1-7 and accompanying text). The magnitude of the Brillouin coefficient, $|\gamma_{SBS}|$, scales quadratically with optical force, yielding a non-linear addition of the radiation pressure and electrostrictively induced couplings to the overall Brillouin gain as shown in FIG. 28. The total Brillouin non-linearity, which is almost exclusively driven by radiation pressure and electrostriction, slowly decreases with increasing resonant frequency as further shown in FIG. 28.

A larger variation in Brillouin non-linearity is seen from the experimental data (e.g., circles of FIG. 29) than from simulations (e.g., 2830, black bars of FIG. 28) due to the variation of the measured phononic Q with frequency (per FIG. 30). However, when the frequency dependence of measured Q-factors is included in simulations (per FIG. 30), good agreement between simulations and experiments are obtained over the entire frequency range, per the green bars and the circles of FIG. 29.

Both the highly localized electrostriction and radiation pressure force distributions within a waveguide core 130 yield a frequency dependent Brillouin gain (as shown in FIG. 28) exhibiting a significant departure from conventional backwards SBS processes involving bulk acoustic waves. In contrast to the rapid 1/Ω roll off of Brillouin gain with phonon frequency found through backward SBS, the experimental (and simulated) Q-factor normalized Brillouin coefficient varies by less than 40% in magnitude over the entire 1-16 GHz frequency range.

Unlike conventional systems where the overlap between the optical force distribution and the phonon mode profile is largely frequency independent, the complex double-lobed spatial force distributions in the core of the silicon waveguide 130 can produce a frequency dependent overlap with various phonon modes, reshaping the frequency dependence of Brillouin coupling. The effect of spatial force distribution on the frequency dependence of coupling can be seen by comparing the computed contributions of electrostriction and radiation pressure to the Brillouin gain of FIG. 28. Although the radiation pressure contribution diminishes quite rapidly with frequency, the ES component varies by only a few percent over the 1-16 GHz frequency range. The higher bandwidth of ES coupling can result from the higher spatial frequencies of the ES force distribution. Consequently, the relatively flat Brillouin gain produces efficient photon-phonon coupling over an unprecedented frequency range.

The magnitude and frequency dependence of the measured Brillouin coupling, and the good agreement with simulations, all provide strong evidence of the important role of both electrostriction and radiation pressure within the waveguide devices formed in accord with the various embodiments presented herein.

The series of Brillouin resonances generated by a waveguide device 100 having d=3.8 μm can provide insight into the bandwidth and frequency dependence of the Brillouin coupling.

Figure 31:
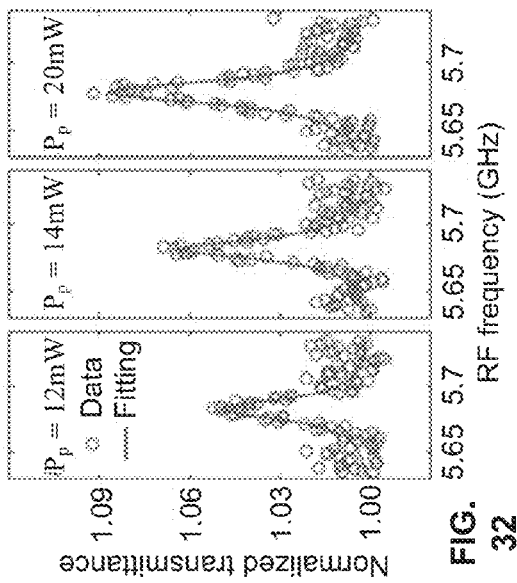
FIG. 31 presents Stokes and anti-Stokes components as a function of RF frequency versus power, according to an embodiment.

However, a larger overall Brillouin non-linearity can be achieved with a higher degree of phonon confinement, that is, for smaller values of d. FIG. 31 shows the Stokes and anti-Stokes spectral line shapes obtained by through-measurement of the d=0.8 μm waveguide device 100. In contrast to the d=3.8 μm device, several sharp spectral features, consistent with high Q-factor (Q~1,500) phononic resonances, are observed within the central Brillouin line shape, suggesting significant inhomogeneous broadening which may be due to fabrication non-uniformities.

A fit of the aggregate Brillouin line shape using a single Lorentzian oscillator model yields is seen in FIG. 31, yielding $G_{SBS}$ and Q-values of $G_{SBS} \cong 4,150 \pm 872$ $W^{-1} m^{-1}$ and $Q \cong 280$. However, uncertainty in the form of inhomogeneously broadened line shape made it difficult to obtain a high confidence estimate of the Brillouin non-linearity in this case, prompting exploration for Brillouin non-linearities through direct measurement of Brillouin gain.

Experimental studies of Brillouin gain were performed by injecting strong pump and weak signal fields into a Brillouin-active waveguide (w=0.8 μm). A low spectral-intensity amplified spontaneous emission (ASE) probe signal (centre wavelength: 1,552.94 nm; bandwidth: 50 GHz) was used in conjunction with a high-intensity pump laser ($\lambda_{p,AS}=1,552.723$ nm or $\lambda_{p,AS}=1,553.158$ nm) to perform Brillouin gain measurements about the Stokes and anti-Stokes frequencies, respectively. The spectral power density of the ASE signal beam was measured by monitoring the heterodyne interference between the pump and signal fields with a receiver and a RF spectrum analyzer (SA) for frequencies about the Brillouin resonance (e.g., v=5.68 GHz).

Figure 32:
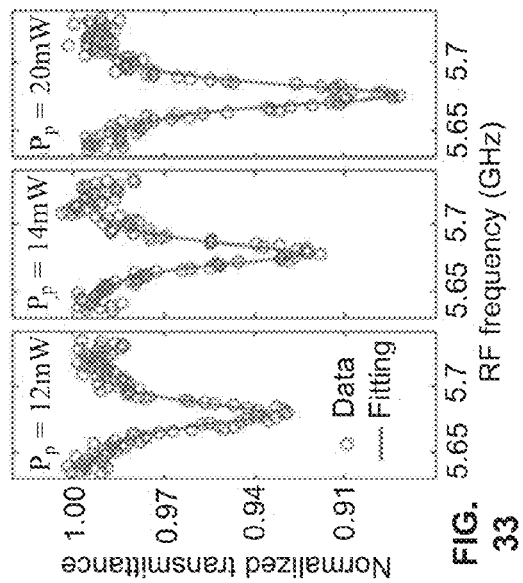
FIG. 32 presents normalized Stokes transmittances for a variety of pump powers, according to an embodiment.
Figure 33:
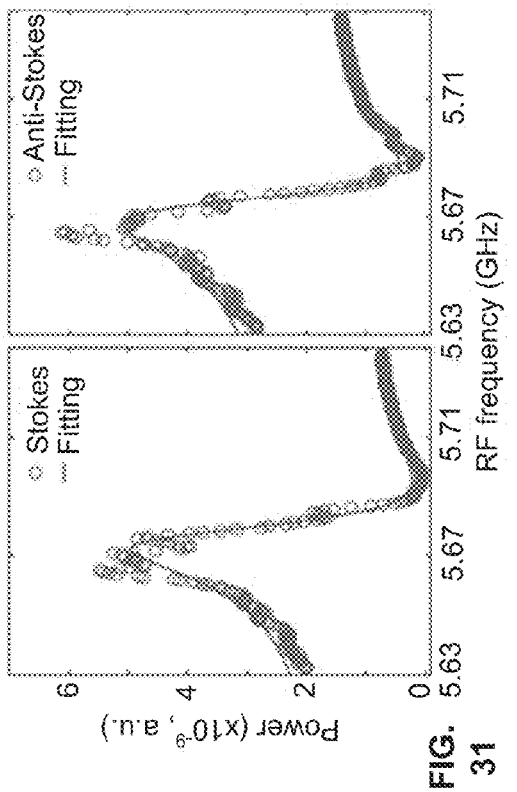
FIG. 33 presents normalized anti-Stokes transmittances for a variety of pump powers, according to an embodiment.

The transmitted ASE power spectral density for higher pump powers are normalized to the power spectral density at lower pump powers (e.g., about 2.6 mW) to observe the power-dependent form of the Stokes and anti-Stokes line shapes. The normalized Stokes and anti-Stokes transmittances for $P_p=12$, 14 and 20 mW are shown in FIGS. 32 and 33 respectively. The finer structure produced by inhomogeneous broadening is not visible owing to the smaller signal-to-noise ratio obtained by this method.

Lorentzian fits of the Stokes and anti-Stokes line shapes yield a Q-factor of approximately 300, indicating significant inhomogeneous broadening. As the anti-Stokes process involves transfer of energy from the signal to the pump beam, the anti-Stokes signature (as shown, e.g., in FIG. 33) exhibits depletion instead of gain as shown in FIG. 32.

Figure 34:
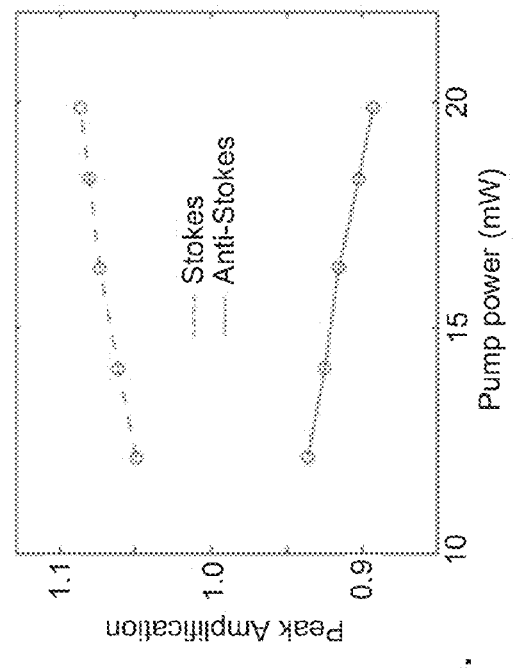
FIG. 34 presents a relationship between pump power and amplification for Stokes and anti-Stokes transmittances.

In FIGS. 31-34, theoretical line fitting curves are indicated in conjunction with experimental data, presented in the form of circles. In the small signal limit, which is explored in the experiments, the SBS gain is proportional to the pump power, and the amplification (and also depletion) at resonant center frequency is linear with the pump power as shown in FIG. 34. A total effective forward SBS gain of $G_{SBS} \cong 2,750 \pm 1,200$ $W^{-1}$ $m^{-1}$ was extracted by fitting the data in FIGS. 32 and 33. This measurement also shows good agreement with the simulated value of Brillouin gain, $G_{SBS} \cong 2,750 \pm 540$ $W^{-1}$ $m^{-1}$. It is to be noted that the derived values for Brillouin gain are more than a factor of 10 larger than those obtained by treating the Brillouin non-linearities of Si as a bulk medium property, which accordingly, provides strong evidence of the role of boundaries in shaping non-linearity at sub-wavelength scales.

The previously presented measurements demonstrate a gain coefficient that is over 1,000 times larger than forward SBS obtainable in a conventional system such as waveguide fibers, and several times larger than the Raman gain produced by Si, making Brillouin non-linearities the dominant third-order non-linearity in the waveguide device 100, in accord with the various embodiments herein.

In accord with the various embodiments presented herein, travelling-wave Brillouin non-linearities and Brillouin gain in waveguide device 100 through a novel class of hybrid photonic-phononic waveguides are further described. Through quantitative measurements, forward SBS non-linear susceptibilities were measured to be more than one thousand times stronger than a conventional waveguide system. Multi-physics simulations reveal that this strong photon-phonon coupling is produced by a constructive combination of ES forces and radiation pressures at the nanoscale. The emergence of large radiation pressure-induced couplings represents a new form of boundary-induced Brillouin non-linearity and a new regime of boundary-mediated Brillouin coupling that arises in subwavelength structures.

The embodiments presented herein enable independent control of phononic modes and optomechanical driving forces to yield tailorable Brillouin coupling over exceptionally wide bandwidths. Simultaneous coupling to numerous transverse phonon modes yields a relatively flat Brillouin gain over this entire 1-18 GHz frequency range. Further, structural tuning of phononic resonances from 1 to 18 GHz with high-quality factor (41,000) yields tailorable non-linear optical susceptibilities due to the coherent interference of Kerr and Brillouin effects.

Further, the various embodiments presented herein indicate a wideband nature of the photon-phonon coupling results from the highly localized optical forces produced within the nanoscale waveguide device 100. The wideband and high-frequency (1.g., about 18 GHz) characteristics can be achieved without a requirement for ultra-high resolution lithography, significantly extending the frequency range of chip-scale photon-phonon coupling over conventional cavity optomechanical technologies.

Efficient coupling between a continuum of optical and phononic modes through such chip-scale travelling-wave Brillouin processes facilitates application in a range of technologies utilizing wideband signal-processing capabilities with CMOS-compatible silicon photonics, including pulse compression, pulse and waveform synthesis, coherent frequency comb generation, variable bandwidth optical amplifiers and filters, and coherent beam-combining schemes. Travelling-wave Brillouin non-linearities can also produce optical phase conjugation and opto-acoustic isolators for application in reducing signal distortion and eliminating parasitic reflection on silicon chips. In addition, the highly controllable nature of the phonons emitted by the waveguide devices presented herein operating as a hybrid photonic-phononic system can facilitate forms of coherent information transduction through travelling-wave processes that are complementary to conventional cavity optomechanical systems.

As efficient Brillouin-based photon-phonon conversion is possible over wide bandwidths (>20 GHz), and the Brillouin-emitted phonons can be guided and manipulated on chip, hybridization of Brillouin device physics with silicon photonics, CMOS and microelectromechanical systems can provide a host of new coherent signal-processing technologies.

It is to be appreciated that the dimensions and frequency bands presented above are to be understood as merely exemplary and not limiting. For example, the spacing of the air slots 150 and 155 may be as small as the width of the optical waveguide 130, and may be as great as 20 µm or more, as may be permitted by the mechanical strength of the membrane 140. In an aspect, degradation in the resonant behavior of the phononic resonators does not appear to be a limiting factor, as the quality factor of the resonator is only weakly dependent, if at all, on the width of the resonator. Hence, device 100 and similarly formed devices, can be effective over a bandwidth as great as 100 MHz to 50 GHz, or even more. Further, the optical waveguide device 100 can be fabricated with a width d of 2.0 µm, or higher.

As previously mentioned, membrane 140 can act to confine the generated phonons. As shown in the phase matching diagrams of FIGS. 12-14, a forward-SBS process phase-matches to phonons with a vanishing longitudinal wave-vector (i.e. slow group-velocity guided phonon states). Hence, at least for certain applications, it might be necessary to engineer high Q-factor phononic resonances that support modes of large transverse wave-vector (i.e. perpendicular to the waveguide). High Q-factor phononic resonances can be achieved by truncating the membrane 140 on either side of the waveguide 130 with etched air-slots 150 and 155 (e.g., of dimension 2×100 µm), per the structure shown in FIGS. 1-4. The slots 150 and 155 can act to reflect acoustic waves, which can further define the extended phonon modes. This geometry, which can be termed, produces efficient photon-phonon coupling over a series of discrete phononic resonances between 1-18 GHz, through a traveling-wave forward-SBS process.

Figure 35:
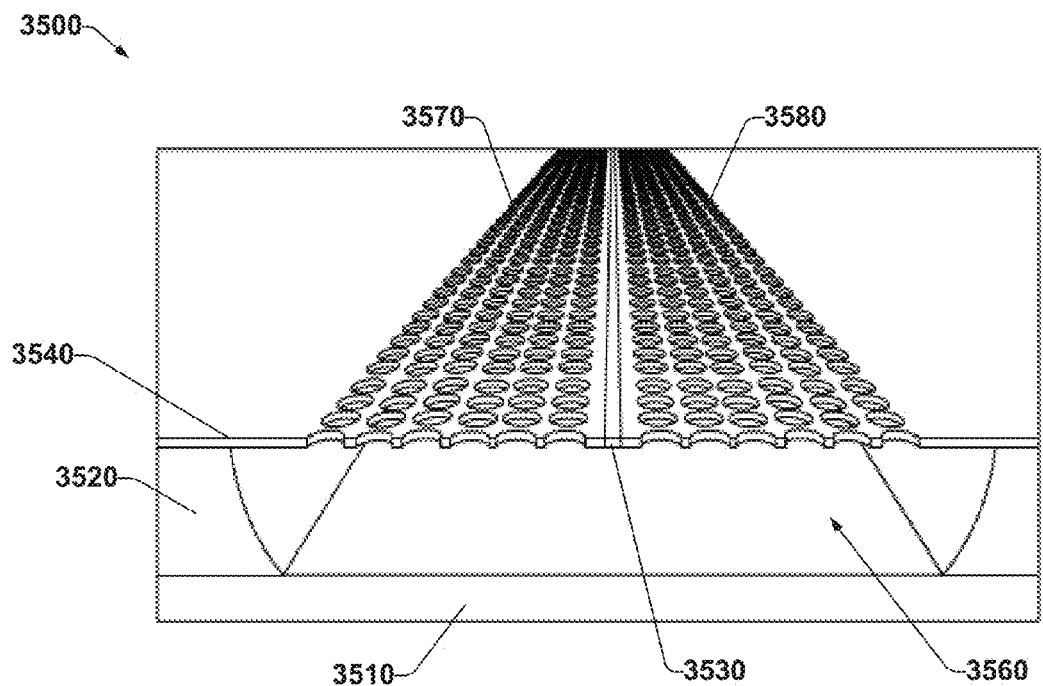
FIG. 35 is a schematic diagram of a waveguide device, according to an embodiment.

Numerous variations on the layout described above with reference to waveguide device 100 are possible and are considered to fall within the scope of the various embodiments presented herein. For example, the air slots 150 and 155 may be replaced by reflective features of other kinds One such alternate reflective feature is a phononic crystal, defined, e.g., by a two-dimensional array of holes etched through the membrane. Another alternate type of reflective feature is a Bragg grating. FIG. 35 presents a waveguide device 3500, where the slotted reflectors of device 100 are replaced with an array of holes 3570 and 3580 (e.g., a pair of phononic crystals) located on either side of a waveguide core 130. Holes 3570 and 3580 can be formed in a membrane layer 3540 which can be formed over a cavity 3560, which has been formed in an insulating layer 3520 on a substrate 3510. As per device 100, the respective components of device 3500 can be formed from materials such as Si (e.g., substrate 3510 and waveguide core 3530), SiO$_2$ (e.g., insulating layer 3520) and Si$_3$N$_4$ (e.g., membrane 3540).

In an aspect, compared with a slot reflector (e.g., slots 150 and 155) device, a device formed with phononic crystal mirrors (hole arrays 3570 and 3580) can facilitate controllable (tailored) leakage (or coupling of energy) from a waveguide core (e.g., waveguide core 3530). The controllable leakage (e.g., across a resonance frequency range of about 1-20 GHz) can facilitate resonant transfer of information (or phonons) between waveguides in the absence of optical energy transfer. Further, phononic crystal waveguides 3500 can be fabricated with longer phononic resonator regions than can be formed with a slot waveguide device. This can eliminate the problem of anchoring losses for the phonons which occurs with slot waveguide devices (e.g., as can occur at region 190).

Figure 36:
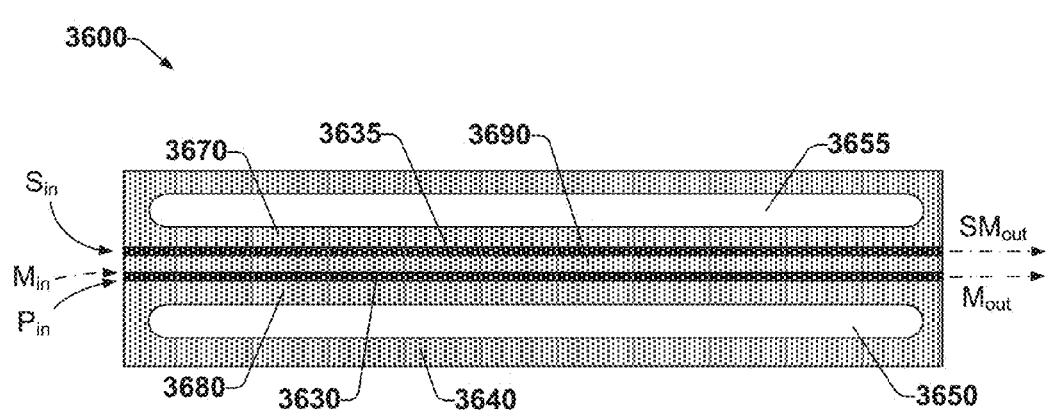
FIG. 36 is a schematic diagram of a waveguide device comprising two waveguides, according to an embodiment.

In other embodiments, the reflective features 150 and 155 of device 100 can have a disposition that is not symmetric about the optical waveguide 130. For example, as shown in FIG. 36, a pair of optical waveguides 3630 and 3635 can be formed in a waveguide device 3600. Waveguides 3630 and 3635 can be disposed parallel to each other and sufficiently near each other to be optically coupled, whereby the coupling can be by a phononic region 3690 located between waveguides 3630 and 3635. Accordingly, rather than optical-cross talk coupling the waveguides 3630 and 3635, the coupling is phononic.

In a conventional approach, if two signals are transmitted down a single waveguide, undesirable cross-talk can occur between the two signal wavelengths owing to non-linearities that may be present. Such an undesirable interaction can occur in Si waveguides. However, by utilizing two separate waveguides 3630 and 3635, each respective signal in each waveguide can communicate with the other signal via the phonons. Accordingly, a pure communication can occur between the two waveguides 3630 and 3635, with narrow resonances available through which the waveguides 3630 and 3635 can transfer information.

In an embodiment, the dual waveguide device 3600 is amenable to narrow acoustic or phononic resonance which can act as an optical filter as the resonances can be in the order of 1 MHz wide. Such narrow or acoustic resonance can be particularly useful for radio frequency signal processing and filtering.

In an illustrative scenario, a pump signal P$_{in}$ is injected into waveguide 3630 in conjunction with a modulated information signal M$_{in}$ which carries the signal information. Accordingly, P$_{in}$ and M$_{in}$ can beat together, with the information in M$_{in}$ being transduced as a function of the beat note. In the second waveguide 3635, a continuous light beam S$_{in}$ can be injected. As light beam S$_{in}$ passes through the waveguide 3635, side bands can be developed, whereby the sidebands can be affected by the transduction, originating in waveguide 3630, and being carried over region 3690. Accordingly, information comprising M$_{in}$ can be carried over to the S$_{in}$ beam leading to S$_{in}$ being modified to a beam SM$_{out}$, whereby SM$_{out}$ includes information transferred over from M$_{in}$.

Figure 37:
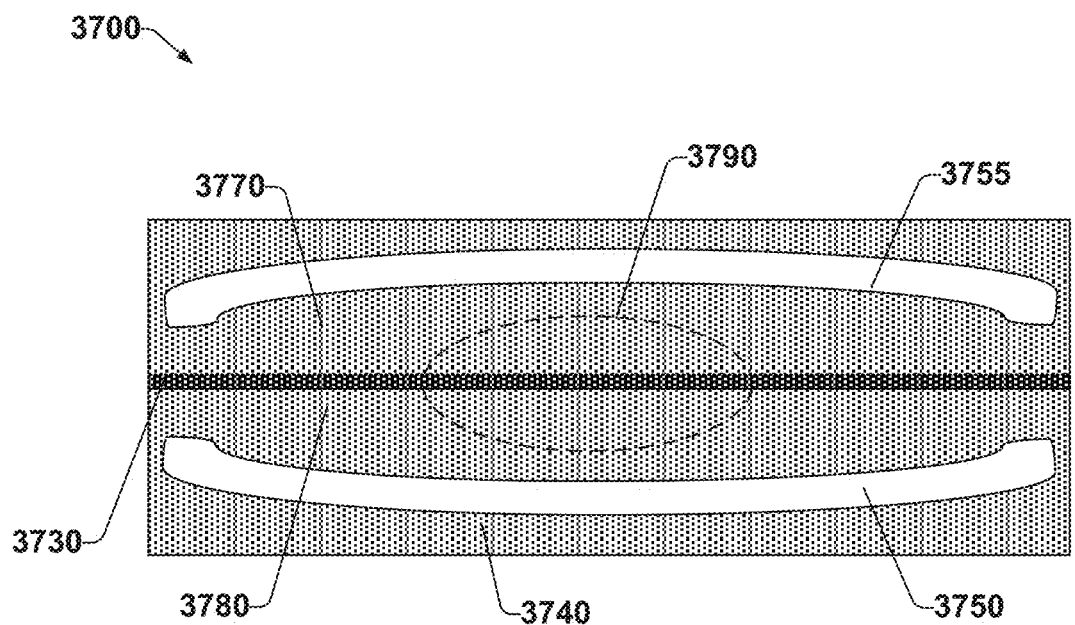
FIG. 37 is a schematic diagram of a confocal waveguide device, according to an embodiment.

In another embodiment, a waveguide device can be formed with confocal resonators. For example, as shown in FIG. 37, a waveguide device 3700 can be formed comprising a pair of confocal resonators 3750 and 3755 formed in membrane 3740. Accordingly, the confocal resonators 3750 and 3755 can act to focus phonons at a central region 3790 located in resonator regions 3770 and 3780 operating adjacent to waveguide core 3730.

In further embodiments, phononic resonators as described above can be traversed by an optical waveguide that is curved and not straight. For example, a Brillouin laser may include an optical resonator that consists of an optical waveguide conformed in a closed curve such as a circle, dimensioned to resonate at a Stokes-shifted or anti-Stokes-shifted pump frequency, and disposed on a path that traverses one or more phononic resonators. When excited by pump radiation introduced, e.g., by optical coupling from an adjacent waveguide, the optical resonator may exhibit gain at the resonant frequency, thus producing amplified Stokes or anti-Stokes radiation. Similar arrangements may serve as optical amplifiers, optical filters, and the like. For example, a Brillouin waveguide can facilitate amplifying a weak signal, when in the presence of a pump signal, to form an amplified output signal.

Those skilled in the art will appreciate that depending on the application, any of the various inputs to such a system may be deemed the signal input, and likewise any of the various outputs may be deemed the signal output. Hence, a system similar to the measurement system previously described can operate to produce an output optical signal in response to an input optical signal, an output optical signal in response to an input RF signal, an output RF signal in response to an input optical signal, or an output RF signal in response to an input RF signal.

Figure 38:
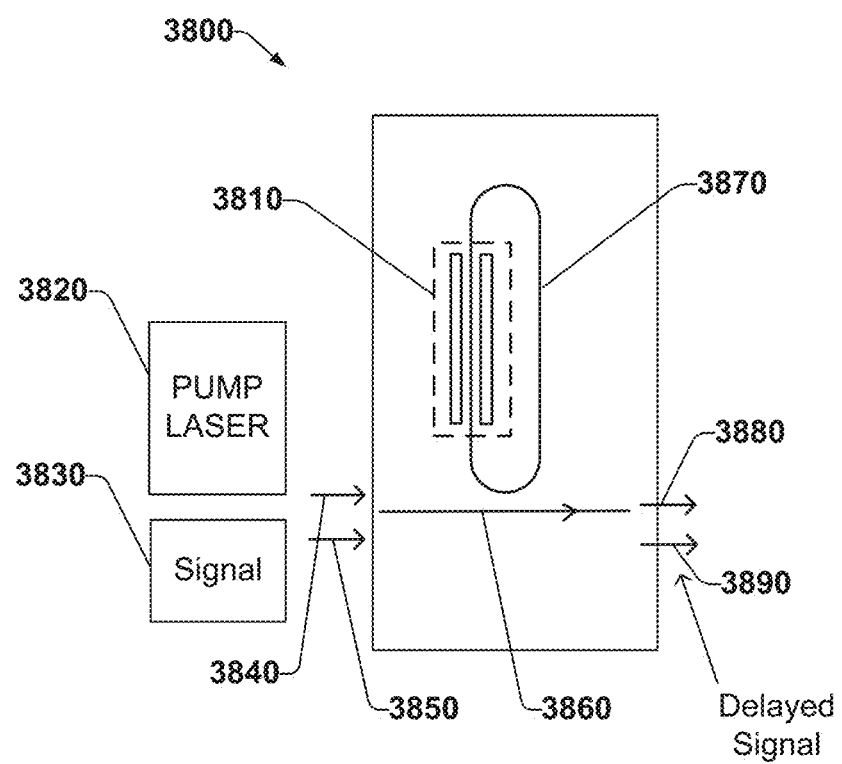
FIG. 38 illustrates a waveguide device being utilized in conjunction with a circular resonant waveguide, according to an embodiment.

In the system described above, RF modulation can be utilized to excite the phonons. On the other hand, phononic excitation may occur without RF modulation in systems that exhibit gain at the Stokes or anti-Stokes frequency. One such example is provided above, i.e. the Brillouin laser using a ring resonator, i.e., a circular resonant waveguide. As shown in FIG. 38, a waveguide device 3180 can be utilized in conjunction with a circular resonant waveguide 3870. A pump laser 3820 and a signal laser 3830 can be utilized to generate respective pump signals 3840 and signals 3850 which can be transmitted into a waveguide 3860. Waveguide 3860 can be coupled to the circular resonant waveguide 3870, whereby Brillouin SBS can occur between the circular resonant waveguide 3870 and waveguide 3860. Based upon the combination of coupling and Brillouin SBS, the output signal 3890 can be delayed with respect to the laser pump signal 3880. In a further example that operates on similar principles, the ring resonator is omitted and instead, the resonant cavity can be defined by a pair of Bragg gratings formed in the optical waveguide traversing the phononic resonators.

Figure 39:
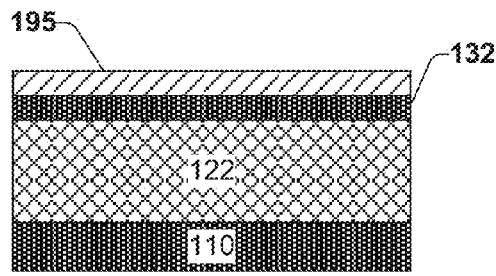
FIGS. 39-44 illustrate various stages in fabrication of a waveguide device, according to at least one embodiment.

FIGS. 39-44 present stages in a fabrication process which can be utilized to form a waveguide device such as devices 100, 3700, 3800, 3900 or 4000. As shown at FIG. 39, a substrate 110 can be formed, where the substrate can comprise silicon. Formed thereon is an insulating layer 122, where the insulating layer can comprise SiO$_2$. A second layer 132, comprising Si, can be formed on insulating layer 122, with a resist layer 195 formed to facilitate patterning to form the waveguide 130. In an embodiment, the waveguide device 100 can be considered to comprise a silicon-on-insulator substrate with a 3000-nm oxide undercladding.

Figure 40:
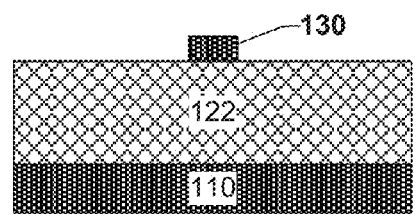

As shown in FIG. 40, a process of deep ultraviolet (UV) lithography, a deep silicon etch (DPS) followed by a resist strip, a standard post-etch, and a pre-diffusion clean, can facilitate formation of a waveguide 130 on the surface of the insulator layer 122.

Figure 41:
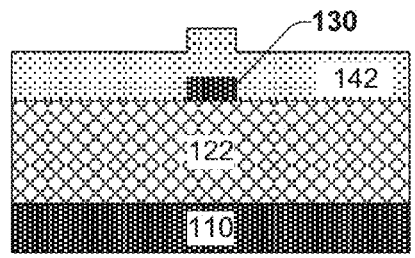

Any suitable process can be utilized to form a Si$_3$N$_4$ layer, as shown in FIG. 41. Such a process can include a low pressure chemical vapour deposition (LPCVD) operation. The nitride layer 142 is deposited on the exposed surface of the insulating layer 122 and also over the waveguide 130, where in an example embodiment, nitride layer 142 can be 300 nm thickness.

Figure 42:
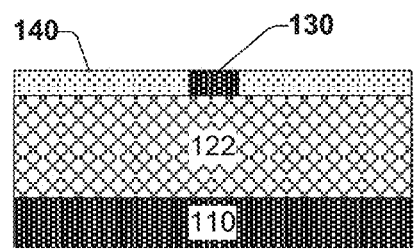

In FIG. 42, a chemical-mechanical polish (CMP) can be performed to preferentially thin the conformal nitride layer atop the waveguide 130. A wet etch, such as hot phosphoric acid etch can also be utilized to clear any remaining nitride atop the waveguide 130.

Figure 43:
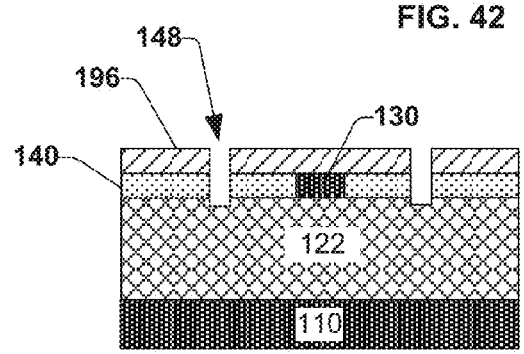

FIG. 43 presents the result of the CMP and cleaning operations. A deep UV lithography operation in conjunction with an etch operation (e.g., a plasma etch) can be utilized to form openings 148 in resist layer 196, and nitride layer 140. The openings 148 can ultimately form air slots 150 and 155. An etch operation (e.g., 49% HF etch with Tergitol) can be utilized to form a hollow region beneath the nitride layer 140.

Figure 44:
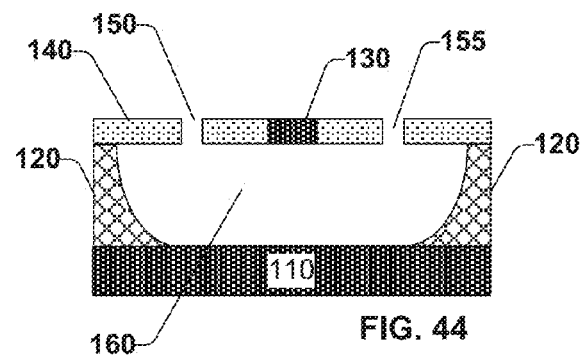

FIG. 44 presents a final structure (e.g., waveguide device 100) comprising a substrate 110, support structures 120, with a membrane layer 140 formed over the opening 160. The membrane layer 140 is attached to the waveguide core 130 and further includes slots 150 and 155.

It is to be appreciated that while the foregoing embodiments (e.g., devices 100, 3500, 3600, and 3700) have presented devices where the waveguide core (e.g., waveguide core 130) is formed from a different material from that used for the resonator membrane (e.g., layer 140), other embodiments are envisaged in which the waveguide core and the membrane layer are formed from the same material. For example, FIG. 45 presents a scanning electron micrograph of a dual photonic crystal waveguide device 4500, wherein the waveguide cores and membranes are formed from the same material, e.g., Si. As shown in FIG. 45, waveguide device 4500 includes two waveguide cores 4530 and 4540 formed in the same layer as membrane 4510 and phononic crystal regions 4250. Waveguide cores 4530 and 4540 are located between a plurality of slots 4550 formed in membrane 4510, whereby the slots 4550 can act to constrain light and/or acoustic waves in the waveguide cores 4530 and 4540.

However, in contrast to the step-index waveguides (e.g., devices 100, 3500, 3600, and 3700) which guide light and/or acoustic waves by total internal reflection (e.g., in waveguide core 130), waveguide 4500 can guide light and/or acoustic information as a consequence of Bragg reflection through the formation of an optical bandgap.

As shown in FIG. 46, if a pump signal Pp is injected into a first waveguide 4540 at a frequency of less than about 8 GHz a conversion efficiency is minimal, even impaired, as shown in FIG. 48, region 4810, with no interaction occurring with the probe beam Pr (e.g., Pr remains flat). In an embodiment, a transmission of energy in the pump signal Pp can be of an ultra-wideband stimulated Mach-wave emission, e.g., across a frequency range of 2-11 GHz. Further, the pump signal Pp can be constrained in the first waveguide 4540 based upon Bragg reflection occurring at the phononic crystal regions 4520. Effectively, the phononic crystal regions act to confine the Pp signal as a function of electrorestrictive forces generated as a result of an optical mode of the Pp signal interacting with the phononic crystal regions 4520, e.g., a phononic defect mode. Owing to the Mach-wave emission, at a frequency of less than about 8 GHz (e.g., a frequency below a phononic bandgap) any acoustic waves generated at the first waveguide 4540 propagate freely across all of the phononic crystal regions 4520.

However, as shown in FIG. 47, when the pump signal Pp is injected into the first waveguide 4540 at a frequency of the phononic bandgap (e.g., of about 8-9.5 GHz, as shown, e.g., in FIG. 48, region 4820), any information in the pump signal Pp can be resonantly coupled to the probe beam Pr injected into the second waveguide 4530. Hence, when operating at a phononic bandgap frequency, the waveguide device 4500 can operate as a tunable reflector for sound (i.e. a phonic bandgap reflector) while simultaneously conveying signal Pp along the first waveguide 4540. The waveguide device 4500 can effect efficient transfer (as shown in FIG. 48) of energy over a narrow bandwidth(s).

As will be understood by those skilled in the art, one possible output of a system such as that described above is a phase-modulated version of the probe beam. The phase modulation may be understood, in one sense, as resulting from changes in the refractive index created by the action of the pump radiation. This behavior can be readily utilized to create, e.g., an optical filter.

Other possible applications utilize an optical frequency comb, created by cascaded Brillouin processes, i.e., by Stokes or anti-Stokes shifts that are repeated one, two, three, or more times. This may occur, for example, in a Brillouin laser in which the free spectral range of the resonant cavity is divisible by the phonon frequency. Because the resulting comb lines are coherent, it might be possible to use such a cascaded process to generate optical pulses.

In other possible applications, the probe beam can be split and simultaneously injected into a plurality of optical waveguides, all of which traverse phononic resonators and all of which are acoustically coupled via the suspended membrane. A pump beam injected into one or more designated driver waveguides generates phonons that propagate through the membrane and locally excite the resonators traversed by the respective optical waveguides at different times determined by the respective phononic propagation delays. The resulting frequency or phase modulation of optical pulses injected via the probe beam can be utilized to operate such an arrangement as an optical pulse delay circuit or an optical pulse shaper.

In Brillouin laser applications, it may be possible to actively mode lock the laser by modulating the pump beam at a desired pulse frequency that is compatible, e.g., with a harmonic of the optical cavity round trip time and of the phononic cavity round trip time.

To facilitate understanding of the various embodiments presented herein, coupled wave equations are developed which describe the nonlinear wave-mixing processes which can occur in a waveguide device 100, and further, derive functional form of the various asymmetric line-shapes observed through heterodyne pump-probe experiments. By utilizing the analytically derived line-shapes, quantitative analyses of the experimental signatures are performed to determine the magnitude of the Brillouin nonlinear coefficient.

As previously described, a function of the various geometries of waveguide devices 100 can facilitate mutually incoherent pump and probe beams being coupled into the Brillouin waveguide. A pump beam can be produced by intensity modulation of a monochromatic laser line. Modulation at frequency $\Omega$, generates a pump beam comprising two frequencies, $\omega_1$ and $\omega_2$, with corresponding wave amplitudes $A_1$ and $A_2$, where $\omega_2 - \omega_1 = \Omega$. A probe beam can comprise of a monochromatic wave having a disparate wavelength to the pump beam, with wave amplitude $A_3$ and frequency $\omega_3$. Nonlinear wave-mixing processes involving $A_1$, $A_2$ and $A_3$ generate Stokes and anti-Stokes fields at frequencies $\omega_s = \omega_3 - \Omega$, and $\omega_a = \omega_3 + \Omega$, with a Stokes wave amplitude $A_s$ and an anti-Stokes wave amplitude $A_a$ respectively. The wave-amplitudes $A_s$ and $A_a$ can be measured through heterodyne detection to produce the line-shapes previously discussed, e.g., with reference to FIGS. 24-34. For simplicity, it can be assumed that both pump and probe waves are coupled to transverse electric-like (TE-like) waveguide modes. Owing to the Stokes and anti-Stokes waves having zero amplitude at the entrance to waveguide 130, the coupled wave equations for Stokes and anti-Stokes wave growth can, to first order, be expressed as:

$$\frac{dA_s}{dZ} = i[\gamma_{SBS}^{(3)*}(\Omega) + 2\gamma_{FWM}^{(3)} + \gamma_{FC}^{(5)}(-\Omega)P_0]A_1^*A_2A_3 \qquad \text{Eqn. 1a}$$

$$\frac{dA_a}{dZ} = i[\gamma_{SBS}^{(3)}(\Omega) + 2\gamma_{FWM}^{(3)} + \gamma_{FC}^{(5)}(+\Omega)P_0]A_1A_2^*A_3 \qquad \text{Eqn. 1b}$$

where, $P_0 = 2(|A_1|^2 + |A_2|^2 + |A_3|^2)$, and $\gamma_{SBS}^{(3)}$ and $\gamma_{FWM}^{(3)}$ are the third order nonlinear coefficients for stimulated Brillouin scattering (SBS) and non-degenerate four-wave mixing (FWM), respectively. In addition, $\gamma_{FC}^{(5)}(\Omega)$ is the fifth order nonlinear coefficient which results from two-photon absorption (TPA) induced by free carrier absorption and refractive index changes imparted by waves $A_1$, $A_2$ and $A_3$. In the above Eqns 1a and 1b, the two-photon absorption (TPA) induced attenuation of $A_s$ and $A_p$ has been neglected, since in this small signal limit, these terms are much smaller than the source terms of Eqn. 1a and Eqn. 1b.

It is assumed that the Brillouin nonlinearity, $\gamma_{SBS}^{(3)}(\Omega)$, is described by a single oscillator, yielding a Lorentzian lineshape of the form:

$$\gamma_{SBS}^{(3)}(\Omega) = \frac{G}{2}\frac{\Omega_m/2Q}{\Omega_m - \Omega - i\Omega_m/2Q} \qquad \text{Eqn. 2}$$

where, $\Omega_m$ is the resonant frequency of the $m^{th}$ mode, Q indicates the quality factor of the phonon resonator, and $G = 2|\gamma_{SBS}^{(3)}(\Omega)|$ is the Brillouin gain. Solving for time-harmonically modulated TPA-induced free carrier generation rate, and using the carrier rate equation to solve for $\gamma_{FC}^{(5)}(\Omega)$:

$$\gamma_{FC}^{(5)}(\pm\Omega) \equiv -\left(\frac{M}{\tau} \pm \frac{V\Omega}{2}\right)\frac{1}{1/\tau^2 + \Omega^2} \qquad \text{Eqn. 3}$$

where M and V are constants with positive value, and τ is the free carrier lifetime. It is to be noted that $\gamma_{FWM}^{(3)}$ is well approximated as a frequency independent constant which can be computed from the waveguide geometry and a nonlinear coefficient of Si. Thus, in an aspect, FWM is non-dispersive, while Brillouin-induced couplings and the free carrier induced nonlinear couplings can have frequency dependent responses in the example frequency sweeping range (e.g., 1-18 GHz).

To remain consistent with the experimental arrangements, it is to be noted that the FWM and free-carrier effect occur through the waveguide entire waveguide length (e.g., a length of 4.9 mm), while the Brillouin-active interaction length is shorter than the total waveguide length (e.g., a length of 2.6 mm). In such a scenario, the optical power of the Stokes field obtained by solving Eqn. 1a is:

$$g_s = C|\gamma_{SBS}^{(3)*}(\Omega)L_{SBS} + (2\gamma_{FWM}^{(3)} + \gamma_{FC}^{(5)}(-\Omega)P_0)L_{tot}|^2 P_1P_2P_3 \qquad \text{Eqn. 4}$$

where C is a constant, $P_k$ indicates the optical power of $k^{th}$ field, and $L_{SBS}$ and $L_{tot}$ are the interaction lengths of SBS and the rest nonlinear responses, respectively. Eqn. 4 consists of two terms, one for Brillouin scattering and another which includes both non-degenerate four-wave mixing (FWM) and free carrier effects. The signal from FWM and free carrier effect is referred to as the reference signal. In the absence of the Brillouin nonlinearities (e.g., for large detuning from a Brillouin resonance) the free carrier and FWM contributions to the Stokes sideband can be described by:

$$g_{os} = CL_{tot}^2|2\gamma_{FWM}^{(3)} + \gamma_{FC}^{(5)}(-\Omega)P_0|^2 P_1P_2P_3 \qquad \text{Eqn. 5}$$

Since the free carrier effects engender a slow variation across a frequency envelope, $\gamma_{FC}^{(5)}(\Omega)$ can be treated as a constant in the vicinity of a single Brillouin resonance (e.g. for frequency spans of less than 100 MHz). Further, owing to $\gamma_{FC}^{(5)}(\Omega) \neq \gamma_{FC}^{(5)}(\Omega)$ from Eqn. 3, the reference signals for Stokes and anti-Stokes are expected to differ from each other when Ω is comparable with 1/τ.

By fitting Eqn. 4 to the experimentally obtained Stokes and anti-Stokes Brillouin scattering signals as shown in FIGS. 27 and 28, it is possible to estimate the Brillouin gain, $G = 2|\gamma_{SBS}^{(3)}(\Omega_m)|$. The normalized fitting function $g_s/g_{os}$ can be derived from Eqns. 4 and 5, to form:

$$\frac{g_s}{g_{os}} = \left|e^{ib_s} + D_n\frac{\Omega_m/2Q}{\Omega_m - \Omega - i\Omega_m/2Q}\right|^2 \qquad \text{Eqn. 6}$$

where $D_n = GL_{SBS}/(2L_{tot}|2\gamma_{FWM}^{(3)} + \gamma_{FC}^{(5)}(-\Omega)P_0|)$ is the relative strength of the Brillouin scattering effect relative to the reference nonlinear responses. Owing to $\gamma_{SBS}^{(3)}(\Omega)$ and $\gamma_{FC}^{(5)}(\Omega)$ being complex functions, the relative phase between the Brillouin scattering signal and background (FWM+FC) nonlinear responses is defined as $b_s$ in Eqn. 6. The proportionality to $P_1$, $P_2$ and $P_3$ as well as the constant C in Eqns. 4 and 5 are normalized out of Eqn. 6.

It is to be noted that owing to the frequency dependent free-carrier effect, different resonant modes are normalized by different nonlinear backgrounds. In the previously described experiments, it was observed that at high frequency (>15 GHz) the amplitude of the reference signal converges to $|2\gamma_{FWM}^{(3)}|$, indicating $|2\gamma_{FWM}^{(3)}| \gg \gamma_{FC}^{(5)}(\Omega)P_0$. The reference signal spectrum can be measured to facilitate obtaining the ration $\eta \equiv |2\gamma_{FWM}^{(3)} + \gamma_{FC}^{(5)}(-\Omega)P_0|/|2\gamma_{FWM}^{(3)}|$. By utilizing established methods for computing $|2\gamma_{FWM}^{(3)}|$, based on well-known values for the Kerr nonlinearities of crystalline Si, an estimate of the Brillouin gain G can be determined according to the following:

$$G = 2D_n\eta|2\gamma_{FWM}^{(3)}|\frac{L_{tot}}{L_{SBS}} \qquad \text{Eqn. 7}$$

It is to be noted that the propagation losses in Eqns. 1a and 1b do not appear in Eqn. 7, as losses do not alter the final functional form of the derived line-shape in the small signal limit.

The magnitude of $\gamma_{FWM}^{(3)}$ produced by the Si waveguide 130 was computed using an accepted Kerr coefficient of $n_2 = 4.5 \times 10^{-18}$ [m²/W] for Si. Employing a full-vectorial method for computing $\gamma_{FWM}^{(3)}$ according to conventional methodology, $|2\gamma_{FWM}^{(3)}|$ is computed to be 188 [1/W/m] for TOPROW waveguides with $Si_3N_4$ membrane widths of d=[1.8, 2.8, 3.8] μm (WIDTH D of FIG. 4). As the $Si_3N_4$ width was reduced to d=0.8 μm, the close proximity of the lateral nitride boundary increases the modal confinement, yielding $|\gamma_{FWM}^{(3)}|$ of 214 [1/W/m].

Figure 49:
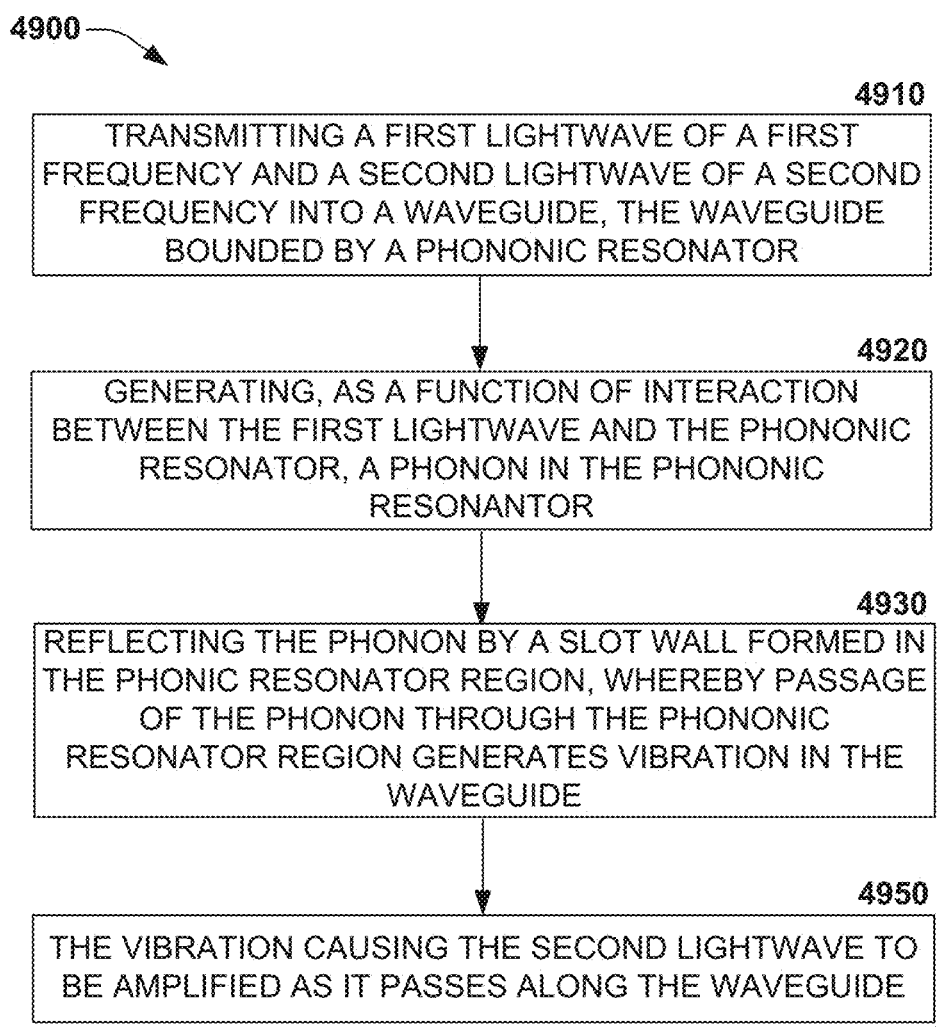
FIG. 49 is a flow diagram illustrating an exemplary methodology for operating a waveguide device to amplify light, according to an embodiment.

FIG. 49 is a methodology relating to phononic-photonic coupling in a membrane device. While methodology 4900 is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement the particular methodology described herein. At 4910, a first lightwave and a second lightwave can be injected into a waveguide device, where the first lightwave has a first frequency and the second lightwave has a second frequency. As previously described, the waveguide device can include a waveguide along which the first lightwave and the second lightwave are transmitted, where the waveguide can be formed in a membrane structure. Located on either side of the waveguide can be a pair of slots which can act to bound a phononic resonator region respectively located on either side of the waveguide.

At 4920, as a function of the first lightwave passing through the waveguide, a combination of electrostrictive and radiation pressure-induced boundary forces can establish phononic activity in the phononic resonators.

At 4930, a phonon in the phononic resonator can propagate out in a direction substantially transverse to the waveguide optical direction. As the phonon propagates out, at a certain distance the phonon is incident upon a slot wall which can cause the phonon to be reflected back to the waveguide, thereby generating one or more optical modes in the phononic resonator, whereby the optical mode can be considered a form of vibration in the phononic resonator.

At 4940, as a function of the vibration in the phononic resonator, the second lightwave can be amplified.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method for making an acousto-optical device, comprising:
    depositing an insulating layer on a substrate;
    forming a waveguiding member on the insulating layer;
    depositing a membrane layer on the insulating layer and on the waveguiding member such that the deposited membrane layer abuts and overlies the waveguiding member;
    removing such of the membrane layer as overlies the waveguiding member;
    patterning the membrane layer so as to define therein at least one longitudinally extensive phononic resonator traversed by the waveguiding member; and
    removing at least a portion of the insulating layer that underlies the membrane layer, including such portion as underlies the longitudinally extensive phononic resonator or resonators.

2. The method of claim 1, wherein the substrate is silicon, the insulating layer is silicon dioxide, the waveguiding member is silicon, and the membrane layer is silicon nitride.

3. The method of claim 1, wherein, in response to a first pulse and a second pulse being injected into the waveguiding member, the membrane layer is conformed so as to convey phonons in a direction transverse to an optical direction of the waveguiding member.

4. The method of claim 3, wherein the phononic resonator is conformed to reflect phonons through the membrane in a direction toward the waveguiding member.

5. The method of claim 1, wherein the patterning of the membrane layer is carried out so as to form a first slot and a second slot on opposing sides of the waveguide member.

\* \* \* \* \*